(12) United States Patent
Sivasubramaniam

(10) Patent No.: US 9,547,875 B2
(45) Date of Patent: *Jan. 17, 2017

(54) DATA-DRIVEN CUSTOMIZABLE PAYROLL ELEMENT TEMPLATE

(71) Applicant: Oracle International Corporation, Redwood Shores, CA (US)

(72) Inventor: Sutharsanan Sivasubramaniam, Reading (GB)

(73) Assignee: Oracle International Corporation, Redwood Shores, CA (US)

(*) Notice: Subject to any disclaimer, the term of this patent is extended or adjusted under 35 U.S.C. 154(b) by 647 days.

This patent is subject to a terminal disclaimer.

(21) Appl. No.: 13/862,571

(22) Filed: Apr. 15, 2013

(65) Prior Publication Data

US 2013/0246235 A1 Sep. 19, 2013

Related U.S. Application Data

(63) Continuation of application No. 13/236,274, filed on Sep. 19, 2011, now Pat. No. 8,423,436.

(60) Provisional application No. 61/384,257, filed on Sep. 18, 2010.

(51) Int. Cl.
*G06F 15/02* (2006.01)
*G06Q 40/00* (2012.01)

(52) U.S. Cl.
CPC .................................. *G06Q 40/125* (2013.12)

(58) Field of Classification Search
CPC ...... G06Q 40/10; G06Q 40/105; G06Q 30/04; G06Q 10/1091; G06Q 10/10
USPC ......................................... 705/28, 30, 32, 34
See application file for complete search history.

(56) References Cited

U.S. PATENT DOCUMENTS 8,423,436 B2 * 4/2013 Sivasubramaniam G06Q 40/125
705/32

* cited by examiner

*Primary Examiner* — Andrew Joseph Rudy
(74) *Attorney, Agent, or Firm* — Sheppard, Mullin, Richter & Hampton LLP

(57) ABSTRACT

Various techniques can be used to customize payroll element templates. One method involves accessing a predefined payroll element template; receiving a template modification value, which is input by a payroll user in response to a question in a predefined payroll questionnaire; customizing the predefined payroll element template, based upon the template modification value, to create a customized payroll element template; and storing the customized payroll element template.

20 Claims, 10 Drawing Sheets

DATA-DRIVEN CUSTOMIZABLE PAYROLL ELEMENT TEMPLATE

CROSS-REFERENCE TO RELATED APPLICATIONS

The present patent application is a continuation of U.S. patent application Ser. No. 13/236,274, filed on Sep. 19, 2011, entitled "Data-Driven Customizable Payroll Element Template"; which claims the domestic benefit under Title 35 of the United States Code §119(e) of U.S. Provisional Patent Application Ser. No. 61/384,257, entitled "Global Element Template Generation," filed Sep. 18, 2010. Both are incorporated by reference in their entirety and for all purposes as if completely and fully set forth herein.

FIELD OF THE INVENTION

This invention relates to computing and, more particularly, to processing payroll information in a computing system.

DESCRIPTION OF RELATED ART

Historically, programs have been written to provide specific functionality to specific customers. These programs were hard-coded to include this functionality, as well as any baseline data required to support that functionality. Whenever a customer needed new functionality or new baseline data, the program would need to be updated by a programmer. As companies have become more globalized, this historical approach has proven inflexible. For example, if each customer in a set of customers for a particular program has an office in a different localization (e.g., is in a different country with its own tax structures and other laws that affect how employee compensation is calculated and/or is part of a different employer with its own compensation structure), each localization may require different functionality and baseline data. It is impractical and expensive to obtain customized payroll programs specifically tailored to each localization.

SUMMARY

Various systems and methods for allowing users to customize payroll element templates are disclosed. In one embodiment, a method involves accessing a predefined payroll element template; receiving a template modification value, which is input by a payroll user in response to a question in a predefined payroll questionnaire; customizing the predefined payroll element template, based upon the template modification value, to create a customized payroll element template; and storing the customized payroll element template.

A system can include one or more processors and memory coupled to the one or more processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
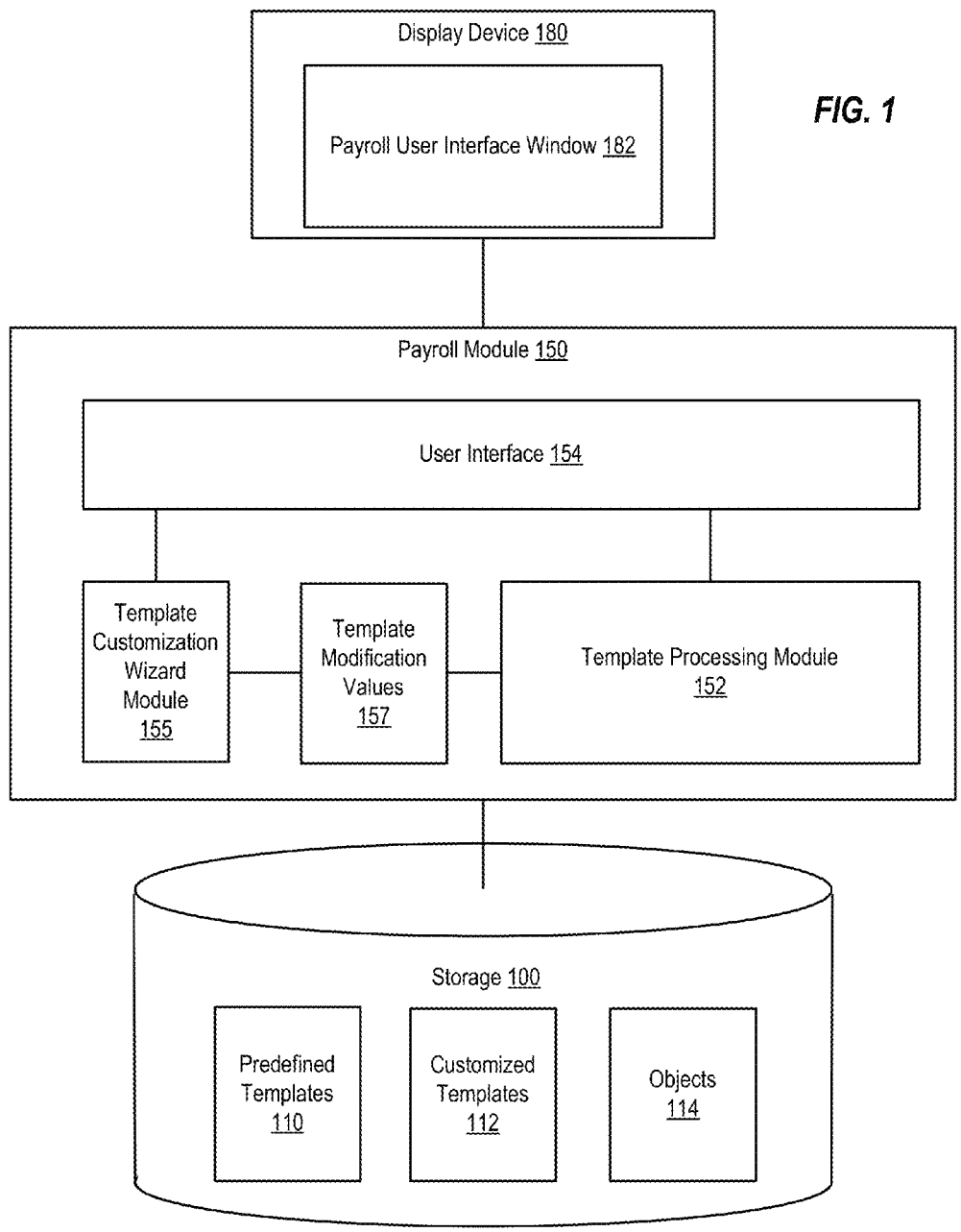
FIG. 1 illustrates a block diagram of a system for customizing payroll element templates, according to one embodiment.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 illustrates a block diagram of a system for customizing payroll element templates. As illustrated, the system includes a storage device 100 that stores one or more predefined templates 110, one or more customized templates 112, and one or more objects 114. Storage device 100 is coupled to a payroll module 150, which includes a template processing module 152, a template customization wizard module 155, a set of one or more template customization values 157, and a user interface 154. Payroll module 150 can be coupled to a display device 180, which can display a payroll user interface window 182.

Each predefined template 110 is a data structure that includes a basic payroll element structure, including one or more records and, if appropriate, relationships between those records (e.g., such as hierarchical parent-child relationships), as well as one or more rules. The rules control the configuration of customized templates derived from the basic payroll element structure, as well as the configuration of payroll objects instantiated from the predefined template and/or customized templates derived from the predefined template. A rule can control which of the records present in the basic payroll element structure should be included in the customized template or object or the default value of such a record. Rules can also dynamically control the configuration process, as explained in more detail below. In some embodiments, rules can be used to provide MLS (MultiLanguage Support). Rules can also control whether resulting objects created from customized template can subsequently be modified or deleted (e.g., such rules can specify whether a resulting object should be read-only).

A predefined template can be an indivisible entity or it can be divided into patterns. For example, in one embodiment, templates can be divided into appropriate functional areas. Each of the Functional Area can have an associated patterns, and a single pattern among them can be used when processing the predefined template.

In one embodiment, the software vendor that provides customers with payroll module 150 provides a variety of predefined templates that correspond to basic payroll elements. Such payroll elements can include formulas, earnings (e.g., bonuses, salary), deductions, and the like. In one embodiment, payroll elements are divided into several generic types of elements, each of which is represented by a predefined template. For example, these generic predefined templates could define flat amount elements, days times (×) rate elements, hours×rate elements, percentage of earnings elements, flat amount deduction elements, percentage deduction elements, professional body elements, and union deduction elements. Examples of these generic predefined templates are provided below. These predefined templates can then be customized to define more specific types of payroll elements.

The customization process can be used to customize a generic payroll element defined by a predefined template for use in a particular localization. A localization can be defined based upon an appropriate legislative entity (e.g., a particular country, state, or other legislative entity that defines rules and/or regulations that affect how payroll is processed in the localization) and/or an appropriate corporate entity (e.g., a particular company may have different payroll rules than another company).

A customized template 112 is a data structure that is derived from a predefined template 110, based upon one or more template customization values. A customized template can be indirectly derived from a predefined template by virtue of being derived from another customized template. In some embodiments, a user can view the interrelationships between predefined and customized templates in a user interface that displays (e.g., in a tree structure) a customized template as a child of the appropriate template (predefined or customized) from which the customized template is derived.

An object 114 is an instance of a payroll element that has been instantiated based upon a template (either a predefined template 110 or a customized template 112). The records included in an object have been assigned values. These values can either be default values (e.g., as defined in the template, either predefined or customized, from which the object was instantiated) or user-provided values. In some embodiments, a user can view the interrelationships between an object and the predefined and/or customized template(s) from which that object is derived in a user interface that displays (e.g., in a tree structure) the object as a child of the appropriate template (predefined or customized) from which the object is derived.

Payroll module 150 is configured to perform payroll processing. The elements of payroll module 150 shown in FIG. 1 are those used to customize predefined templates. As shown, payroll module 150 includes a template customization wizard module 155. Template customization wizard module 155 is configured to receive user input (e.g., from a user such as a human user or other application) configuring a predefined template 110 (e.g., via user interface 154) and to store (e.g., in local memory or other storage usable by payroll module 150) this user input as one of template modification values 157. Template processing module 152 then uses template modification values 157, in conjunction with the predefined template 110 being configured, to generate a customized template 112. Template processing module 152 then stores the customized template in storage 100 as one of customized templates 112.

As noted above, a predefined template includes one or more rules. Each of these rules can have several corresponding options (e.g., true or false, value options, or the like). By selecting an option, a user can customize the predefined template to generate a customized template. Template customization wizard module 155 is configured to allow a user to select a predefined template to customize (e.g., via user interface 154). Template customization wizard module 155 then accesses the selected predefined template to identify the rule(s) included in that predefined template. Based upon these rules, template customization wizard module 155 dynamically creates a questionnaire to be presented to the user (e.g., in payroll user interface window 182 by user interface 154). Examples of the questions that can be included in such a questionnaire are shown in FIGS. 3A-3J.

Each question within the questionnaire can correspond to one of the rules in the predefined template. Additionally, each question can indicate two or more options that are selectable in response to the question. When a user selects an option, information indicating that selection is provided to template customization wizard module 155 for storage as a template modification value. These values control the configuration and functionality of an object instantiated from the customized template. It is noted that questions can be reused among various templates. For example, many different templates can include the same rule, and template customization wizard module 155 can be configured to display the same question each time that rule is encountered within a template.

As a user creates new customized templates, new questionnaires corresponding to the specific rules included in the new templates are also created. For example, when template customization wizard module 155 accesses a customized template, the questionnaire generated from the rules in that customized template can vary from the questionnaire that would be generated for the predefined template from which the customized template is derived. Thus, different localizations can also customize questionnaires.

The above technique for customizing predefined templates provides a data-driven approach, since customization can be performed by simply providing data (the responses to the questions in the questionnaire) to the template customization wizard module. This means that a user can create customized templates without needing to update any of the underlying code that is used to implement payroll module 150.

While the above example has focused on customizable templates for use in creating customized payroll elements, it is noted that other embodiments may provide customizable templates for other types of elements. For example, similarly structured templates and modules for customizing those templates could be used in systems that provide product configuration, human resources management, compensation management, support for multiple languages in other systems, and the like.

Similarly, while the above example has focused on a system in which a user customizes a predefined template via a graphical user interface such as payroll user interface window 182, other embodiments may receive this user input via other interfaces, such as a service (e.g., a web service) that another application can call to access an application programming interface (API) provided by payroll module 150, a command line interface (CLI) accessed by a human user or other program, or the like.

Payroll user interface window 182 can be part of a graphical user interface (GUI) or command line interface (CLI) provided by an application that includes payroll module 150. In some embodiments, the application can be a web-based application that users interact with via a web browser, and thus payroll user interface window 182 can be a web browser or other client and payroll module 150 can be part of a web server or configured to provide the information usable to generate payroll user interface window 182 to such a web server for inclusion in web content being sent to web clients.

Storage device 100 provides persistent data storage, such that data stored on such a storage device will remain stored even after the storage device is powered off. Such a storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storage devices and/or storage systems. For example, such a storage device can be a logical volume that is implemented on a RAID storage system. Additionally, such a storage device can include one or more storage devices. A storage device can also include one or more types of storage media, including solid state media (e.g., Flash drives), optical media (e.g., CDs and DVDs), and magnetic media (e.g., hard disks or magnetic tape). In some embodiments, such storage devices can be implemented using cloud storage, in which the storage device is a logical storage device to which physical storage device(s) are allocated on an as-needed and/or as-contracted basis.

Display device 180 is configured to display graphical and/or textual information to a user. A display device can include an output-only device such as a cathode ray tube (CRT), liquid crystal display (LCD), or plasma monitor. Alternatively, a display device such as a touch screen display can provide both input and output functionality, allowing a user to modify objects and/or object presentation directly via the display device.

Display device 180, hierarchical data interface 150, and storage 100 can be coupled directly (e.g., via a bus, local wireless link, or other appropriate interconnect) or indirectly (e.g., via a network). In one embodiment, these elements are each coupled by one or more networks, which may include a WAN (Wide Area Network), such as the Internet, one or more LANs (Local Area Networks), and/or one or more SANs (Storage Area Networks).

Figure 2:
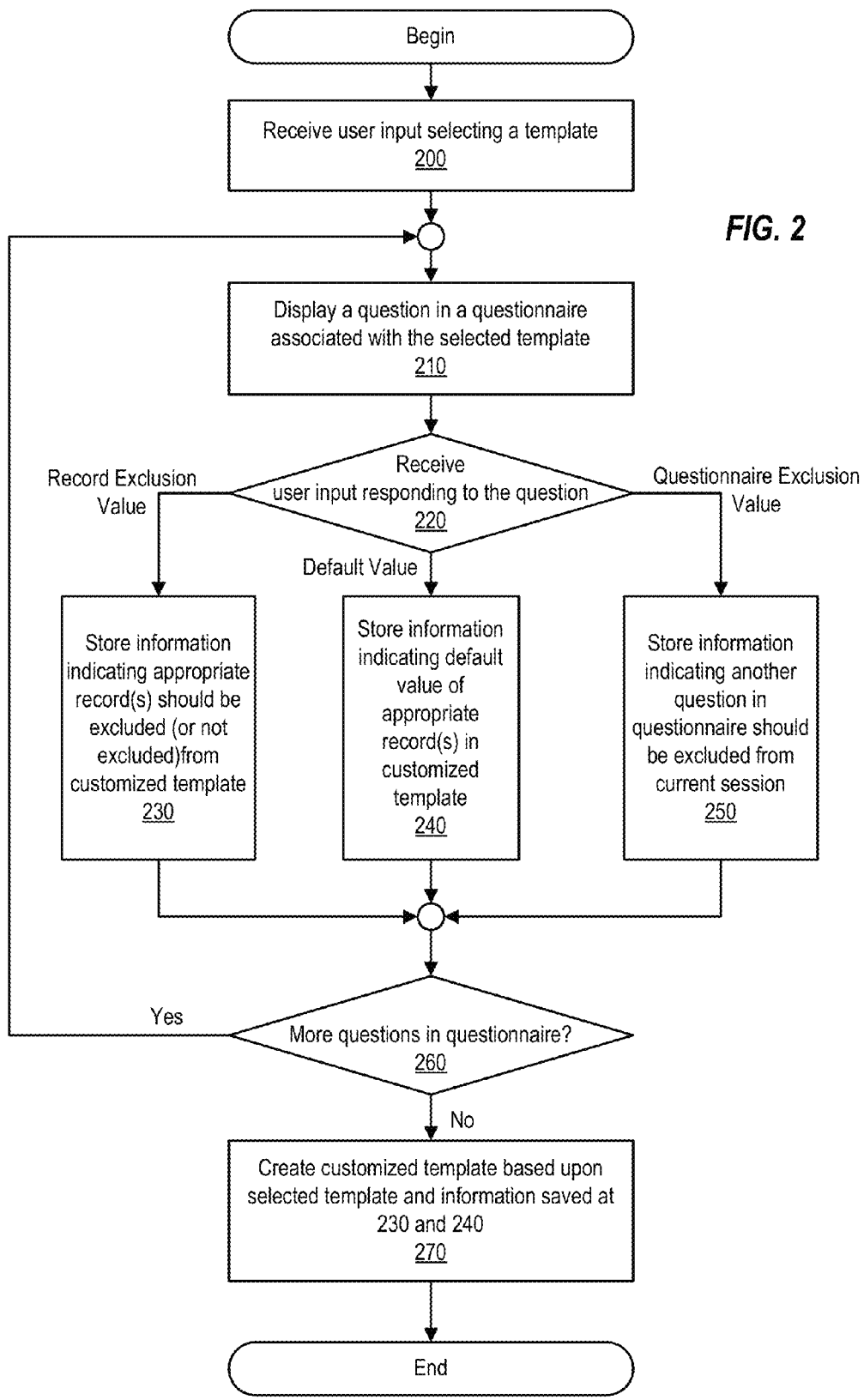
FIG. 2 is a flowchart of a method of customizing payroll element templates, according to one embodiment.

FIG. 2 is a flowchart of a method of customizing payroll element templates. This method can be performed by various components of a payroll module such as payroll module 150 of FIG. 1.

The method begins at 200, when user input selecting a template is received. This template is either a predefined template or a customized template derived from a predefined template. This template can be customized using the remaining operations of FIG. 2. An object can be instantiated from the template using similar operations that set values for each of records included in the template.

At 210, a question in a questionnaire associated with the selected template is displayed or otherwise provided to the user. The questionnaire is a dynamically generated set of questions that is based upon the rules included within the selected template. Each question is based upon a respective rule in the template.

In response to the question, user input is received, as indicated at 220. If the user input is a record exclusion value (e.g., a value that will determine whether a particular record in a template is to be excluded from the customized template), the payroll module will store information indicating that the appropriate record(s) should be excluded (or not excluded) from the customized template, as shown at 230. If the record to be excluded is a parent to one or more other records in a hierarchical relationship, those child records should also be excluded.

If the user input is a default value, the payroll module will store information indicating the default value of the appropriate record(s) in the customized template, as indicated at 240. In some embodiments, certain default values may imply default values of one or more other records, and thus those implied default values may also be identified in the information stored at 240.

If the user input is a questionnaire exclusion value, the payroll module will store information indicating that another question in the questionnaire should be excluded (or not excluded) from the current customization session, as indicated at 250. For example, if certain questions only apply to certain scenarios, and the user input indicates that those scenarios are not applicable, the corresponding questions for those scenarios can be excluded from the current questionnaire.

If there are more questions remaining in the questionnaire (as modified, if needed, by operation 250), the next question can be displayed at 210. Once all questions have been answered, the payroll module creates a customized template based upon the selected template and the information saved at 230 and 240, as indicated at 270.

Certain questions may not be displayed to the user. Instead, the answers to these questions may be received during other operations in the customization process. For example, the answer to a question about the type of currency may be obtained based upon user selection of a legislative data group. In that case, the type of currency would be the type appropriate for the legislative data group. Thus, some questions (and their corresponding rules) can be considered to be hidden, since these questions are not explicitly presented as part of the questionnaire, even though the resulting template modification values obtained in response to these hidden questions can be used to customize the template.

The following rules provide an example of the rules that can be included in various predefined payroll element templates: Reporting Name, Output Currency (can be a hidden question whose value is based upon the selected legislative data group), specify currency (can be a hidden question whose value is based upon the selected legislative data group), chosen classification, chosen secondary classification, and effective date (can be a hidden question whose value is based on the date of the session to customize the predefined template).

Certain rules can be used to ascertain the duration of an employee's eligibility for an element. For example, a rule can correspond to the question "All eligible employees automatically receive this element?" and the possible response values can be selected from yes or no. Similar duration questions can include "When does employee eligibility begin?" (default value=hire date); "When does employee eligibility terminate?" (default=final close date); and the like.

Certain rules can be used to configure a calculation. For example, questions corresponding to these rules can ask "How do you want derive the calculation?" (value=Entered Value/Pay Source/Balance; default value=Entered Value); "Time Definition associated with the derivation?" (value=Annual/Monthly/Weekly/Daily/Hourly/Periodic; default value=Annual); "Is the value subject to full time calculation?" (value=Yes/No/Yes—Excluding Hourly Rates; default value=Yes—Excluding Hourly Rates); "Select the Pay Source" (value=Input Value/Element Name/Spinal Point/Grade Rate/Deduction Information Repository; excluded=Calculation Source (NOT Pay Source)); "Which Input Value?"; "Calculation Type (Percentage or Factor)?" (value=percentage/factor; default=percentage;); "Calculation Value?"; "Which Spinal Point?", "Which Grade Rate?", Deduction Information Repository?", "Which Balance?", and the like.

Certain rules will be excluded by the answers given to questions corresponding to other rules. For example, certain rules may only apply in certain situations. If an answer to a prior question excludes those situations, there is no need to display the rules that apply to those situations to the user.

Some rules determine how other rules will be processed. For example, questions such as "At which level should this be attached?" (value=Payroll Relationship Level/Contract Level/Assignment Level), "Recurring, or requires explicit entry each payroll period?" (value=Automatically recur/Entered each payroll period; default value=Entered each payroll period); "Process only once in each payroll?"; "Is more than one entry of this earning allowed for an employee in a pay period?"; "Separate or joint processing?"; "Which deductions should be processed?"; "When should this deduction start?"; "How to derive the deduction when an earnings threshold has been reached?"; "Subject to Employer Liabilities?"; and the like. Additional processing rules can correspond to questions such as "Overrides allowed for this element?"; "Subject to Proration?"; "Subject to Retrospective changes?"; "Used to calculate the gross amount from a specified net amount?"; "Processing Stop when the Total is reached?"; "Reduce regular earnings?"; and the like.

Figure 3A:
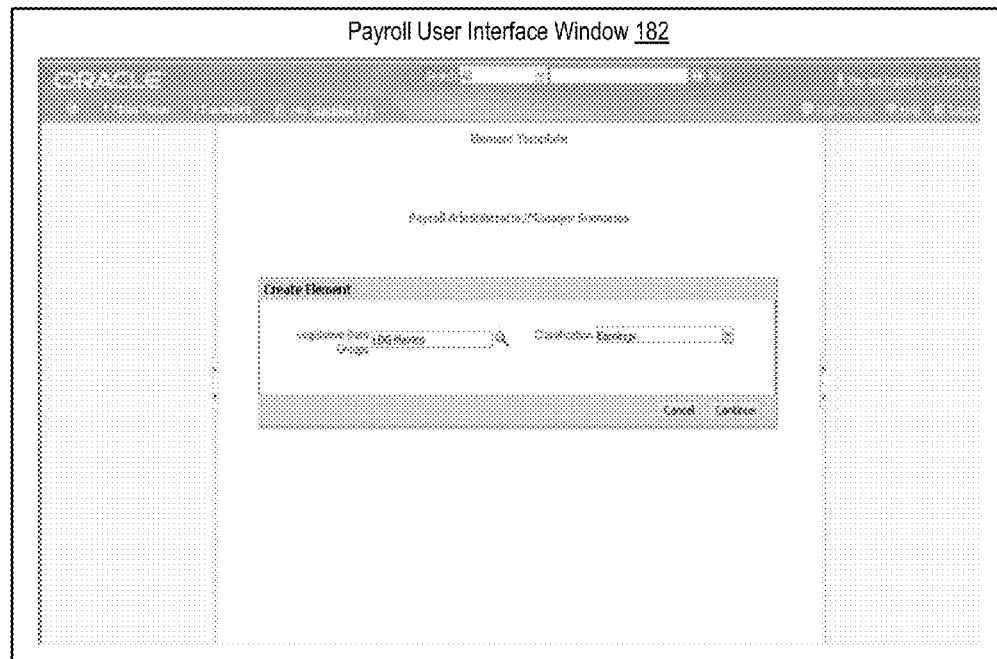
FIG. 3A illustrates an example of a user interface screen for creating a customized payroll element template, according to one embodiment.

FIG. 3A illustrates an example of a user interface screen for creating a customized payroll element template. As shown, the selection of the appropriate template will be based on the user's choice of a Legislative Data Group (LDG) and a Classification from respective dropdown menus. In various embodiments, information usable to select a predefined template can include: Name (of the user's LDG); Reporting Name; Template Description; Input Currency (which may default to the local currency detected based upon the LDG); Primary Classification; Secondary Classification; Effective Start Date (default to session date); Element Template Type (e.g. Basic, Court Orders, Professional Body, etc); Calculation Rule; and the like. In one embodiment, earnings classifications can include Information, Earnings, Supplemental Earnings, Taxable Benefits, Direct Payment, Employer Charges, and the like. Deductions classifications can include Pre-Statutory Deductions, Tax Deductions, Social Insurance Deductions, Involuntary Deductions, Voluntary Deductions, and the like.

Figure 3B:
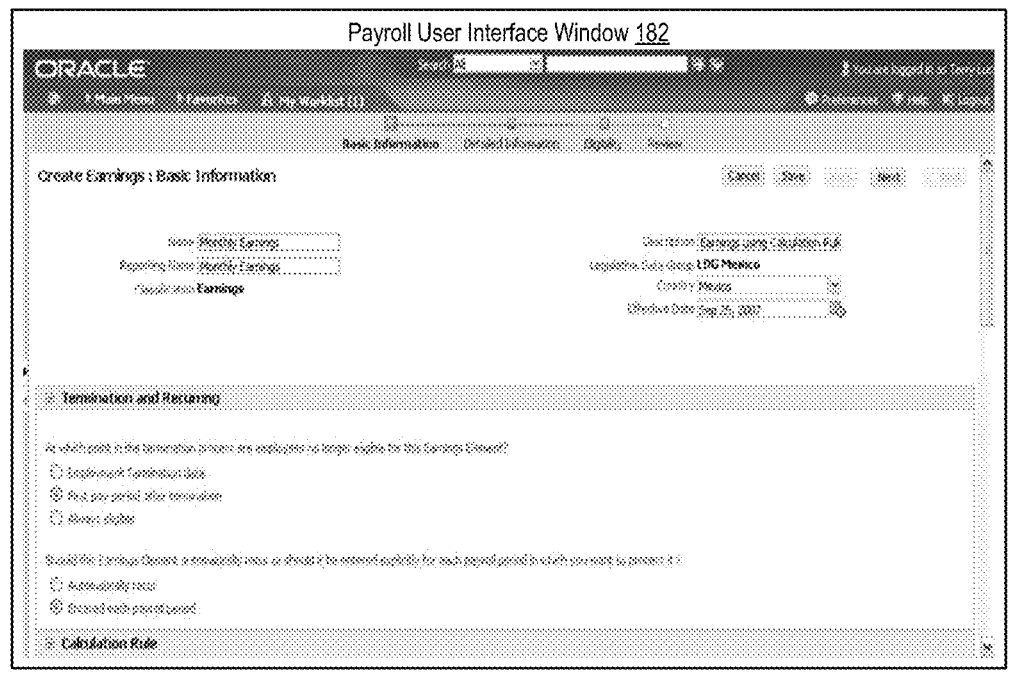
FIG. 3B illustrates an example of a user interface screen for entering basic information to customize a payroll element template, according to one embodiment.

FIG. 3B illustrates an example of a user interface screen for entering basic information to customize a payroll element template. As shown, a user can enter text for certain questions, such as "Name" and "Reporting Name." The user can select options from a pull down menu in response to other questions, such as "Country." Other questions can be answered by selecting a radio button, such as those in the "Termination and Recurring" section of this page.

Figure 3C:
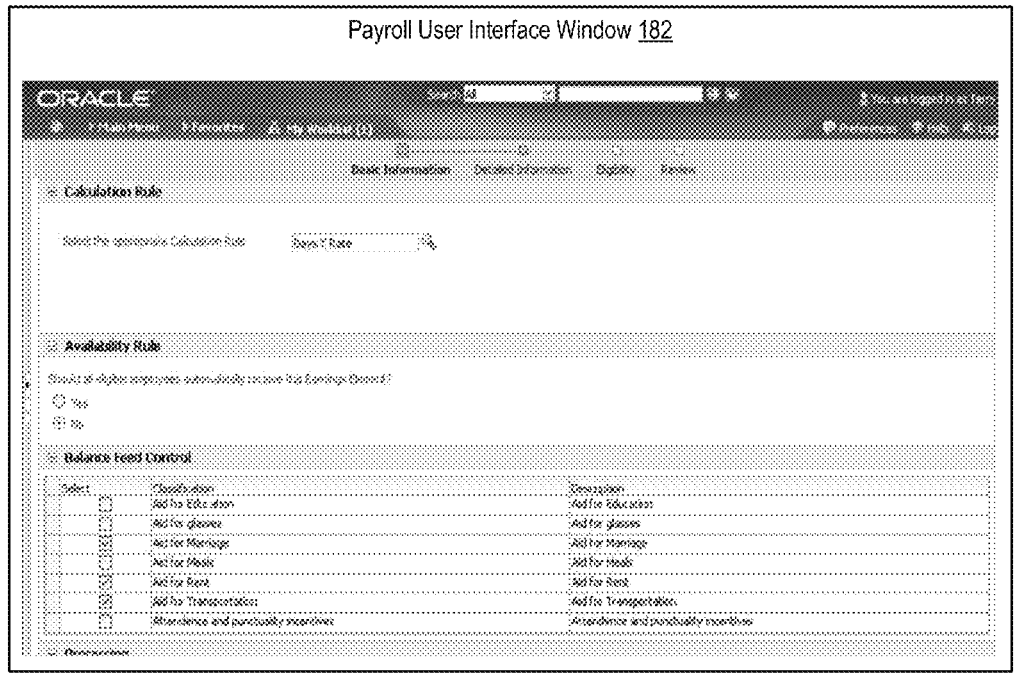
FIG. 3C illustrates an example of another user interface screen for entering basic information to customize a payroll element template, according to one embodiment.

FIG. 3C illustrates an example of another user interface screen for entering basic information to customize a payroll element template. This screen indicates how certain questions can be answered by selecting checkboxes. The values obtained in response to these questions can be used to include checked records and exclude unchecked records from the resulting customized template.

Figure 3D:
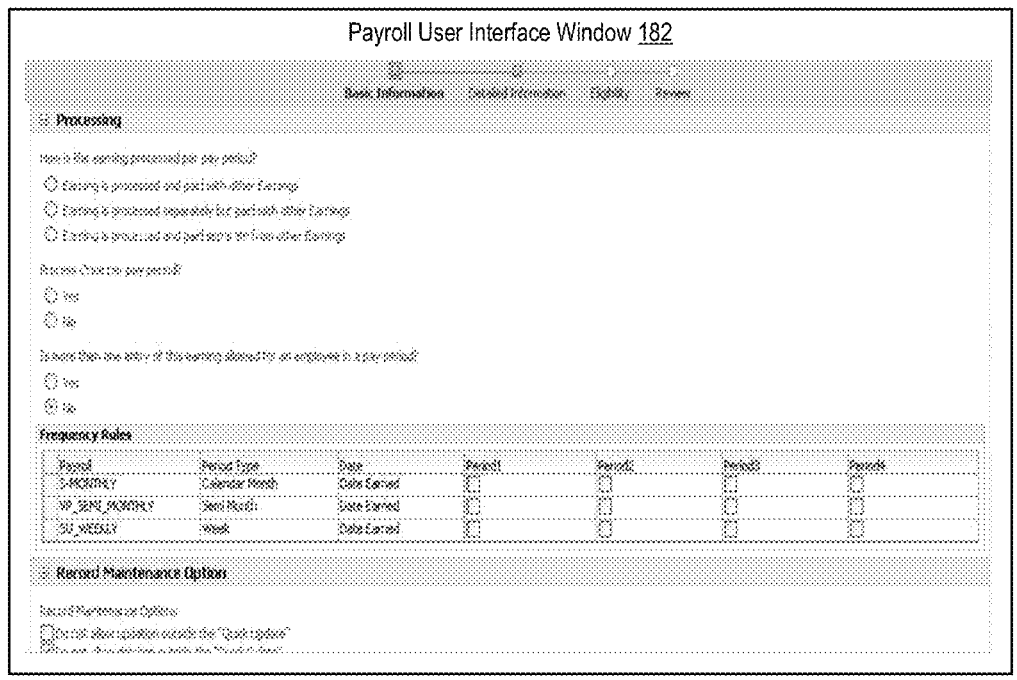
FIG. 3D illustrates an example of yet another user interface screen for entering basic information to customize a payroll element template, according to one embodiment.
Figure 3E:
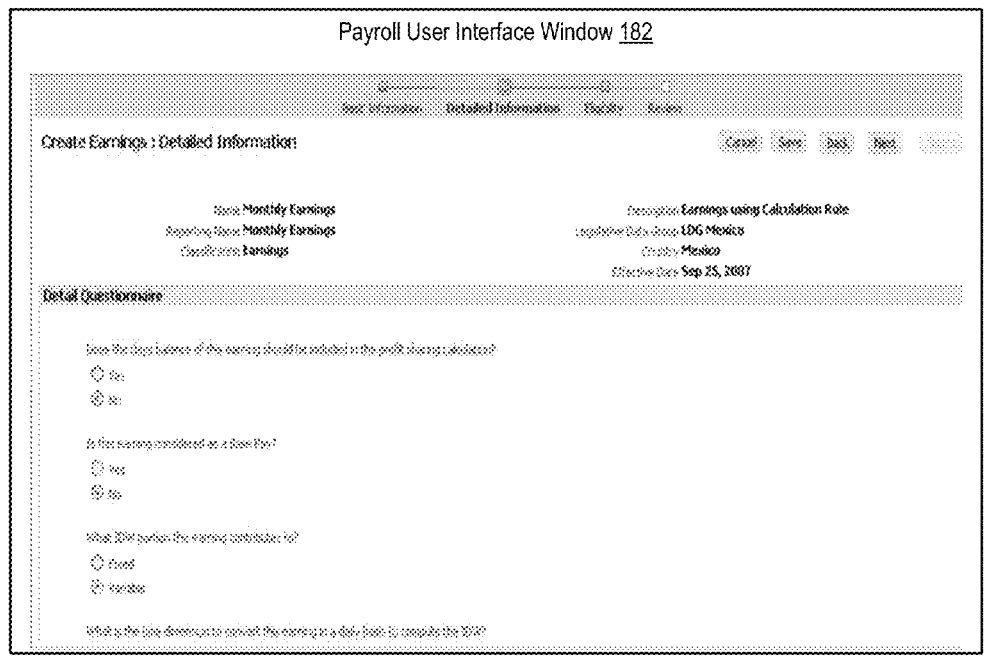
FIG. 3E illustrates an example of a user interface screen for entering detailed information to customize a payroll element template, according to one embodiment.
Figure 3F:
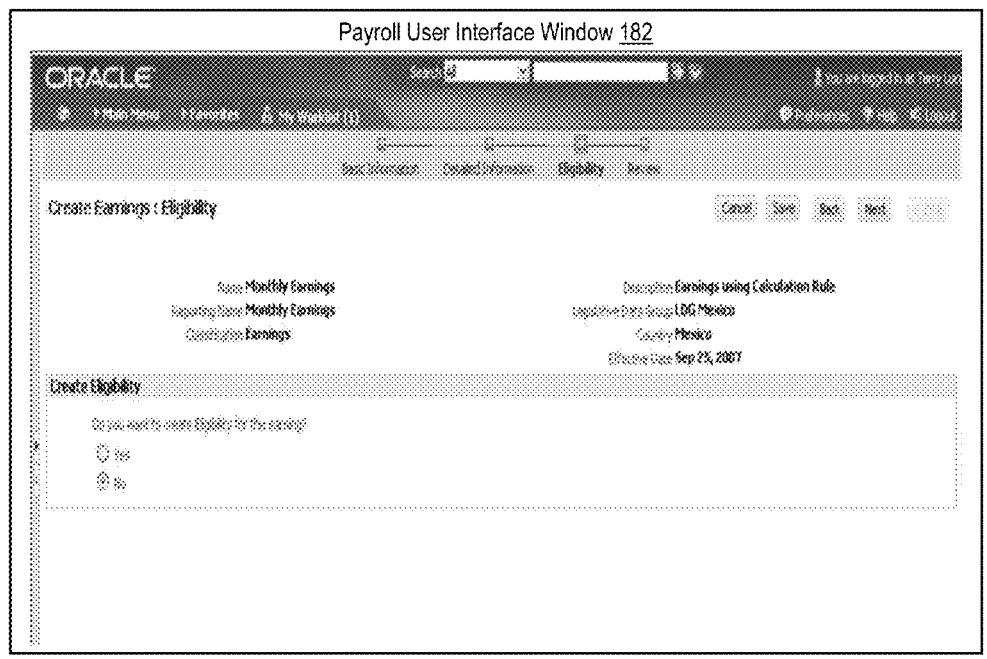
FIG. 3F illustrates an example of a user interface screen for entering eligibility information to customize a payroll element template, according to one embodiment.
Figure 3G:
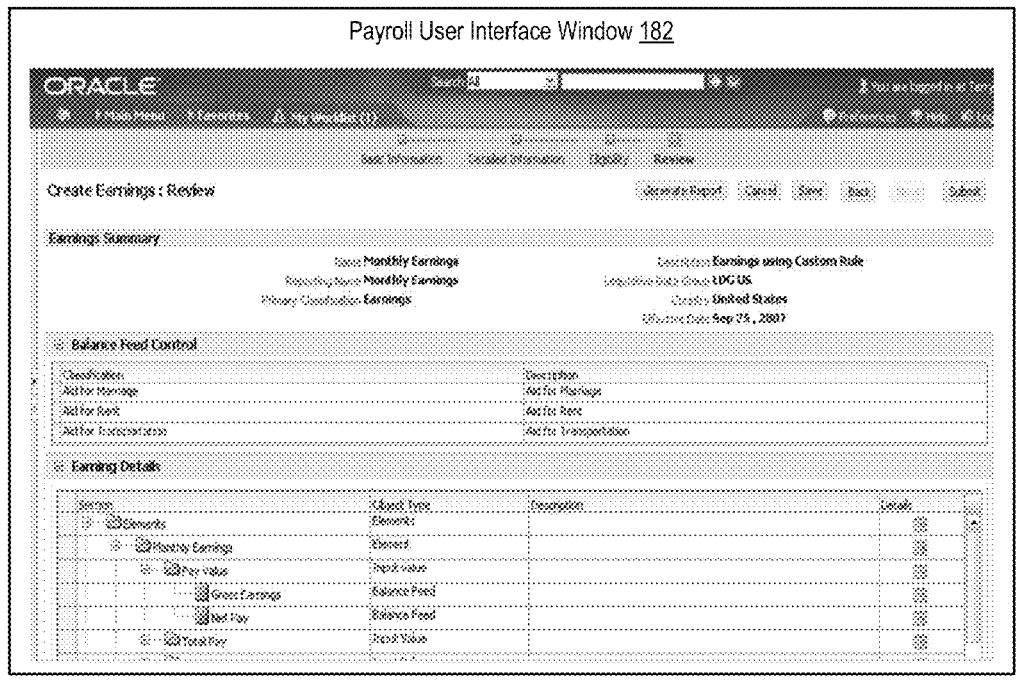
FIG. 3G illustrates an example of a user interface screen for reviewing customization information provided to customize a payroll element template, according to one embodiment.
Figure 3H:
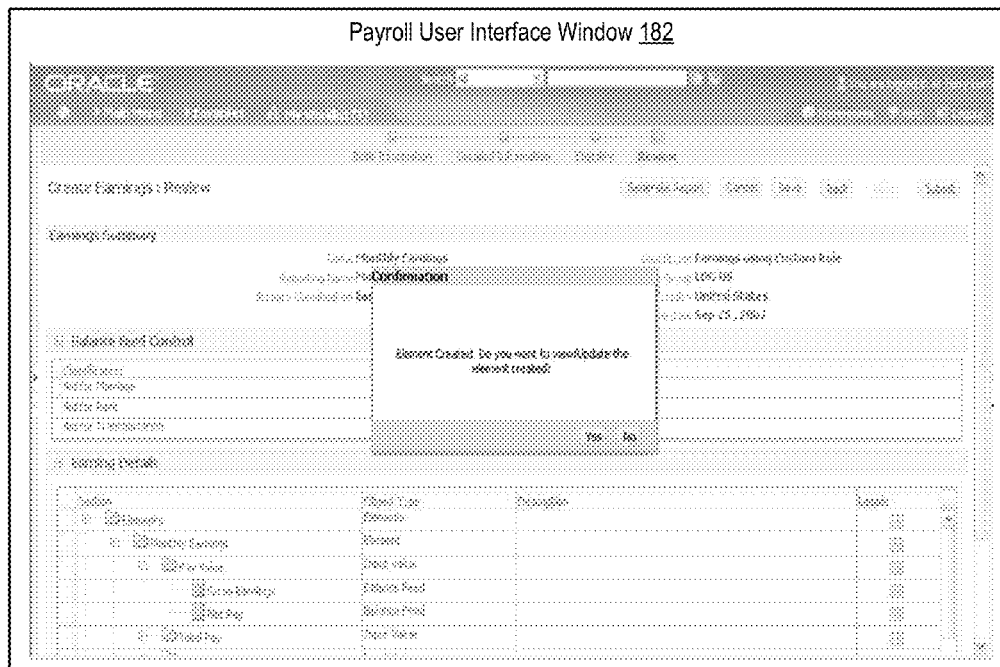
FIG. 3H illustrates an example of a user interface screen for submitting customization information, according to one embodiment.
Figure 3J:
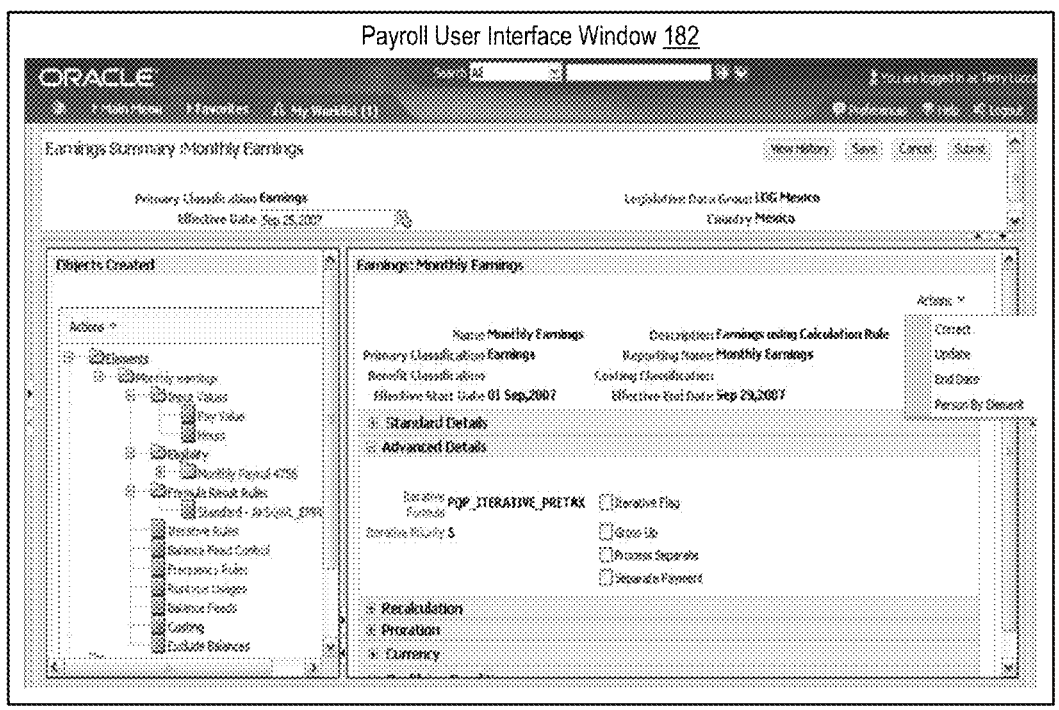
FIG. 3J illustrates an example of a user interface screen for viewing a summary of a customized payroll element template, according to one embodiment.

FIG. 3D illustrates an example of yet another user interface screen for entering basic information to customize a payroll element template. FIG. 3E illustrates an example of a user interface screen for entering detailed information to customize a payroll element template. FIG. 3F illustrates an example of a user interface screen for entering eligibility information to customize a payroll element template and/or an object instantiated from a template. FIG. 3G illustrates an example of a user interface screen for reviewing customization information. FIG. 3H illustrates an example of a user interface screen for submitting customization information. FIG. 3J illustrates an example of a user interface screen for viewing a summary of a customized payroll element template.

The user interface shown in FIGS. 3A-3J allows a user to select a template for customization and to customize that template via a particular user interface window, where the content (e.g., the questions) to be displayed in that user interface window is dynamically generated by a template customization wizard module. It is noted that various different types of predefined templates can be customized in the same user interface window by the same template customization module. Thus, an earnings payroll element template can be customized via the same user interface window as a deduction payroll element template. Similarly, an earnings payroll element object can be instantiated from the same user interface window as a deduction payroll element object.

Figure 4:
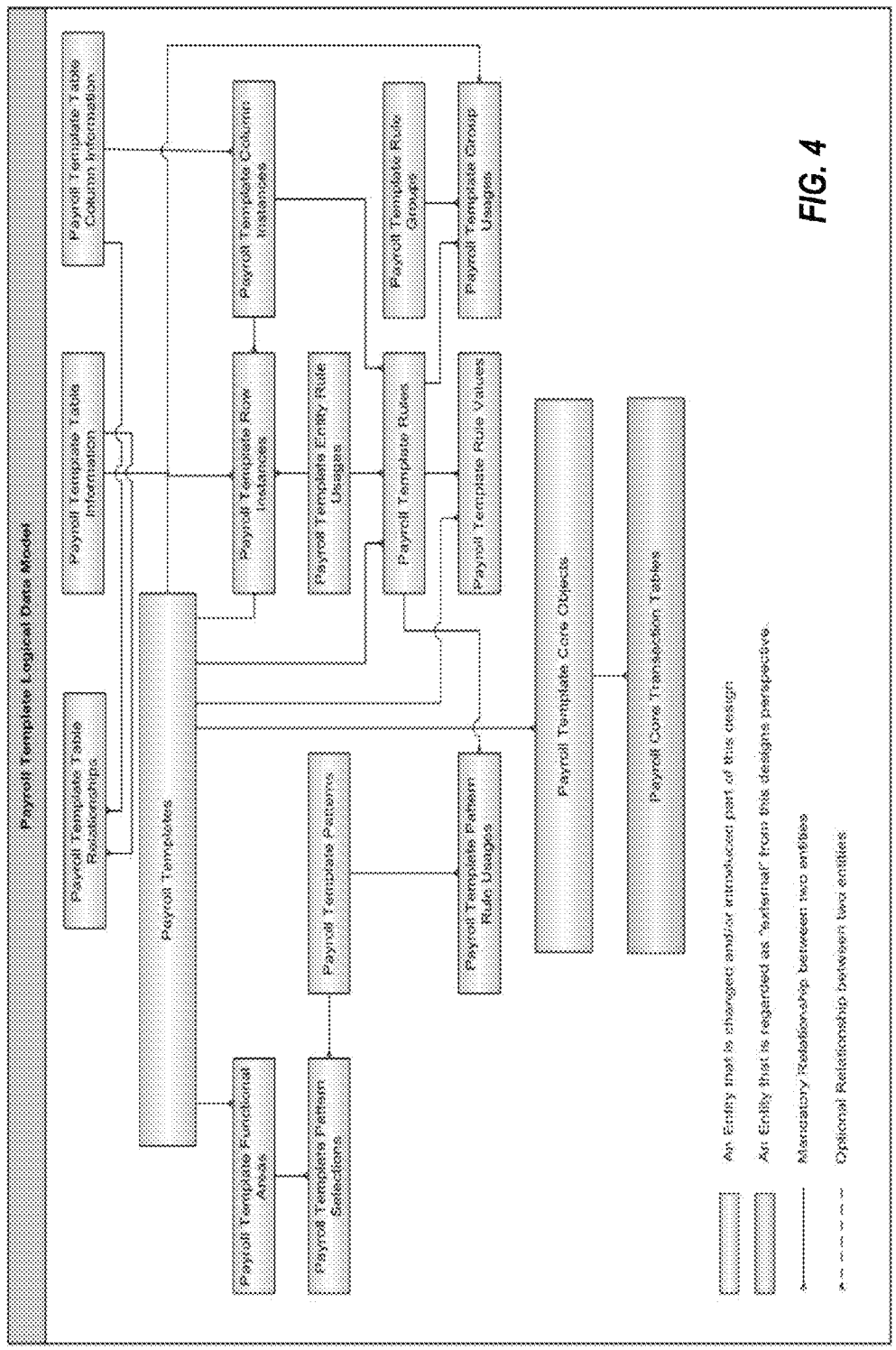
FIG. 4 is block diagram of a payroll template logical data model, according to one embodiment.
Figure 5:
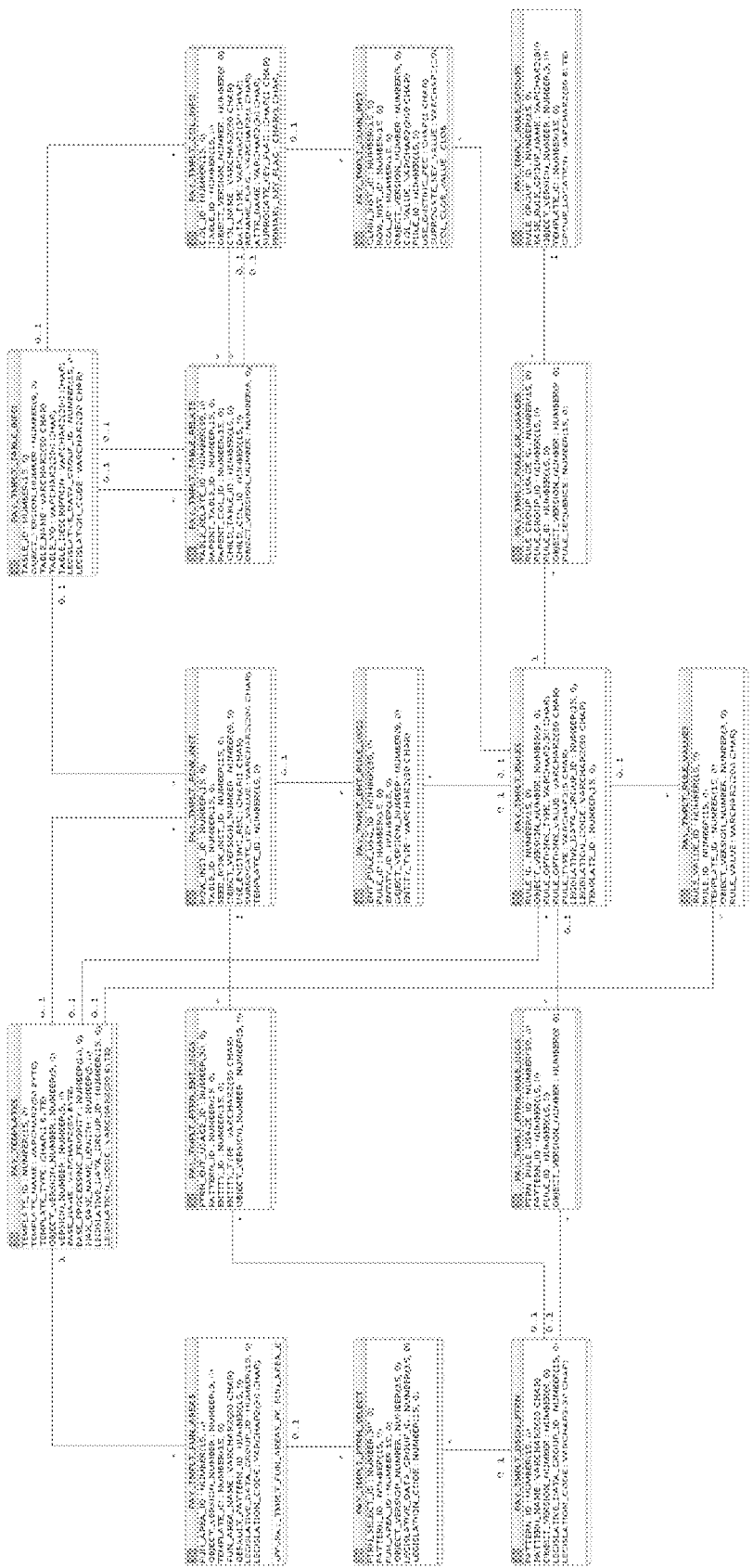
FIG. 5 illustrates an example of a payroll template physical data model, according to one embodiment.

FIG. 4 is block diagram of an example of a payroll template logical data model that can be used in some embodiments. FIG. 5 illustrates an example of a payroll template physical data model that corresponds to the logical data model of FIG. 4. The elements of FIGS. 4 and 5 are described in more detail below.

The PAY_TMPLATES table:

| COLUMN NAME | DATATYPE | MANDATORY | DESCRIPTION |
| --- | --- | --- | --- |
| TEMPLATE_ID | NUMBER(15) | Yes | |
| TEMPLATE_NAME | VARCHAR2(50 CHAR) | Yes | |
| TEMPLATE_TYPE | CHAR(1 CHAR) | Yes | |
| OBJECT_VERSION_NUMBER | NUMBER(9) | Yes | |
| VERSION_NUMBER | NUMBER(5) | No | |
| BASE_NAME | VARCHAR2(50 CHAR) | No | |
| BASE_PROCESSING_PRIORITY | NUMBER(10) | No | |
| MAX_BASE_NAME_LENGTH | NUMBER(5) | No | |
| LEGISLATIVE_DATA_GROUP_ID | NUMBER(15) | No | |
| LEGISLATION_CODE | VARCHAR2(30 CHAR) | No | |
| CREATED_BY | NUMBER(15) | Yes | WHO COLUMN |
| CREATION_DATE | DATE | Yes | WHO COLUMN |
| LAST_UPDATED_BY | NUMBER(15) | Yes | WHO COLUMN |
| LAST_UPDATE_DATE | DATE | Yes | WHO COLUMN |
| LAST_UPDATE_LOGIN | NUMBER(15) | No | WHO COLUMN |

The PAY_TMPLT_TABLE_INFO table stores the table information of the element types and associated objects.

| COLUMN NAME | DATATYPE | MANDATORY | DESCRIPTION |
| --- | --- | --- | --- |
| TABLE_ID | NUMBER(15) | Yes | |
| OBJECT_VERSION_NUMBER | NUMBER(9) | No | |
| TABLE_NAME | VARCHAR2(30 CHAR) | Yes | |
| TABLE_VO | VARCHAR2(200 CHAR)) | No | |
| TABLE_DESCRIPTION | VARCHAR2(200 CHAR) | No | |
| LEGISLATIVE_DATA_GROUP_ID | NUMBER(15) | No | |
| LEGISLATION_CODE | VARCHAR2(30 CHAR) | No | |
| CREATED_BY | NUMBER(15) | Yes | WHO COLUMN |
| CREATION_DATE | DATE | Yes | WHO COLUMN |
| LAST_UPDATED_BY | NUMBER(15) | Yes | WHO COLUMN |
| LAST_UPDATE_DATE | DATE | Yes | WHO COLUMN |
| LAST_UPDATE_LOGIN | NUMBER(15) | No | WHO COLUMN |

The PAY_TMPLT_COL_INFO table stores the column name of the column and also the attribute name. The table id in this table refers to the table information table. This rename flag indicates whether the column should be renamed when the template processing module processes the seeded data to generate a template structure. Generally columns like Element Name, Input Name will have the flag set to 'Y'. The Surrogate Key Flag indicates whether the column is a surrogate Key in the table. The Primary Key Flag indicates whether the column is a primary key in the table.

| COLUMN NAME | DATATYPE | MANDATORY | DESCRIPTION |
| --- | --- | --- | --- |
| COL_ID | NUMBER(15) | Yes | |
| TABLE_ID | NUMBER(15) | No | |
| OBJECT_VERSION_NUMBER | NUMBER(9) | No | |
| COL_NAME | VARCHAR2(30 CHAR) | No | |
| DATA_TYPE | VARCHAR2(30 CHAR) | No | |
| RENAME_FLAG | VARCHAR2(1 CHAR) | No | |
| ATTR_NAME | VARCHAR2(30 CHAR) | No | |
| SURROGATE_KEY_FLAG | CHAR(1 CHAR) | No | |
| PRIMARY_KEY_FLAG | CHAR(1 CHAR) | No | |
| CREATED_BY | NUMBER(15) | Yes | WHO COLUMN |
| CREATION_DATE | DATE | Yes | WHO COLUMN |
| LAST_UPDATED_BY | NUMBER(15) | Yes | WHO COLUMN |
| LAST_UPDATE_DATE | DATE | Yes | WHO COLUMN |
| LAST_UPDATE_LOGIN | NUMBER(15) | No | WHO COLUMN |

The PAY_TMPLT_ROW_INST table stores the object information. The SEED_ROW_INST_ID column stores the row_inst_id of the object from which it is created. If it is a seeded row then the value of the seed_row_inst_id is the same row_inst_id.

| COLUMN NAME | DATATYPE | MANDATORY | DESCRIPTION |
| --- | --- | --- | --- |
| ROW_INST_ID | NUMBER(15) | Yes | |
| TABLE_ID | NUMBER(15) | No | |
| SEED_ROW_INST_ID | NUMBER(15) | Yes | |
| OBJECT_VERSION_NUMBER | NUMBER(9) | No | |
| CREATED_BY | NUMBER(15) | Yes | WHO COLUMN |
| CREATION_DATE | DATE | Yes | WHO COLUMN |
| LAST_UPDATED_BY | NUMBER(15) | Yes | WHO COLUMN |
| LAST_UPDATE_DATE | DATE | Yes | WHO COLUMN |
| LAST_UPDATE_LOGIN | NUMBER(15) | No | WHO COLUMN |
| USE_EXISTING_REC | CHAR(1 CHAR) | No | |
| SURROGATE_KEY_VALUE | VARCHAR2(200 CHAR) | No | |
| TEMPLATE_ID | NUMBER(15) | No | |

The PAY_TMPLT_CLMN_INST table stores the actual values of the objects that are seeded. This table refers to the row instance table and the column instance table. The column value is stored in col_value and col_clob_value. USE_EXISTING_REC indicates if this column has to be picked from the seeded data or the core tables. SURROGATE_KEY_VALUE hase the value of the surrogate key that will be used by the engine to get the column value (this is used when the use_existing_rec is not null). The RULE_ID column stores the rule_id from the pay_tmplt_rules table. If a user wants to default the value of the column, then this RULE_ID has to be associated with a rule of type "D" in the pay_tmplt_rules table.

When the template processing module encounters the value "Y" in 'Use_existing_rec' in pay_tmplt_clmn_inst table, the template processing module picks up the surrogate_key_value and checks the pay_tmplt_table_relate to find the parent table (like pay_element_classification) for the entity (like pay_element_types table in the above example) in the pay_tmplt_clmn_inst table. Then the template processing module picks up the value of the primary key id (that matches the surrogate_key_value in the pay_tmplt_clmn_inst table) from the parent table and populates it into the column col_value of the pay_tmplt_clmn_inst table.

| COLUMN NAME | DATATYPE | MANDATORY | DESCRIPTION |
| --- | --- | --- | --- |
| CLMN_INST_ID | NUMBER(15) | Yes | |
| ROW_INST_ID | NUMBER(15) | No | |
| COL_ID | NUMBER(15) | No | |
| OBJECT_VERSION_NUMBER | NUMBER(9) | No | |
| COL_VALUE | VARCHAR2 (200 CHAR) | No | |
| COL_CLOB_VALUE | CLOB | No | |
| RULE_ID | NUMBER(15)) | No | |
| USE_EXISTING_REC | CHAR(1 CHAR) | No | |
| SURROGATE_KEY_VALUE | VARCHAR2 (200 CHAR) | No | |
| CREATED_BY | NUMBER(15) | Yes | WHO COLUMN |
| CREATION_DATE | DATE | Yes | WHO COLUMN |
| LAST_UPDATED_BY | NUMBER(15) | Yes | WHO COLUMN |
| LAST_UPDATE_DATE | DATE | Yes | WHO COLUMN |
| LAST_UPDATE_LOGIN | NUMBER(15) | No | WHO COLUMN |

The PAY_TMPLT_TABLE_RELATE table stores the relationships between tables. The template processing module uses this when exclusion rules are applied to a template.

| COLUMN NAME | DATATYPE | MANDATORY | DESCRIPTION |
| --- | --- | --- | --- |
| TABLE_RELATE_ID | NUMBER(30) | Yes | |
| PARENT_TABLE_ID | NUMBER(15) | No | |
| PARENT_COL_ID | NUMBER(15) | No | |
| CHILD_TABLE_ID | NUMBER(15) | No | |
| CHILD_COL_ID | NUMBER(15) | No | |
| OBJECT_VERSION_NUMBER | NUMBER(9) | No | |
| CREATED_BY | NUMBER(15) | Yes | WHO COLUMN |
| CREATION_DATE | DATE | Yes | WHO COLUMN |
| LAST_UPDATED_BY | NUMBER(15) | Yes | WHO COLUMN |
| LAST_UPDATE_DATE | DATE | Yes | WHO COLUMN |
| LAST_UPDATE_LOGIN | NUMBER(15) | No | WHO COLUMN |

The following tables are examples of rule tables. The PAY_TMPLT_RULES table stores the rules that are displayed to the user in the wizard. There are three types of rules: Basic rules (rule_type value "B"), which are rules that appear in the basic information page in the template wizard; exclusion rules (rule_type value "E"), which are rules that appear in the detailed information page and are tied to templates; and default rules (rule_type value "D"), which are used to default a column of one or more objects to a user-specified default value. Rule_option_type indicates whether the input type in the wizard questionnaire should be a radio button (value "R") or input text value (value "I"). Rule_option_value defines the value set by the radio buttons.

| COLUMN NAME | DATATYPE | MANDATORY | DESCRIPTION |
|---|---|---|---|
| RULE_ID | NUMBER(15) | Yes | |
| OBJECT_VERSION_NUMBER | NUMBER(9) | No | |
| RULE_OPTIONS_TYPE | VARCHAR2(30 CHAR) | Yes | |
| RULE_OPTIONS_VALUE | VARCHAR2(30 CHAR) | No | |
| RULE_TYPE | VARCHAR2(5 CHAR) | No | |
| LEGISLATIVE_DATA_GROUP_ID | NUMBER(15) | No | |
| LEGISLATION_CODE | VARCHAR2(30 CHAR) | No | |
| CREATED_BY | NUMBER(15) | Yes | WHO COLUMN |
| CREATION_DATE | DATE | Yes | WHO COLUMN |
| LAST_UPDATED_BY | NUMBER(15) | Yes | WHO COLUMN |
| LAST_UPDATE_DATE | DATE | Yes | WHO COLUMN |
| LAST_UPDATE_LOGIN | NUMBER(15) | No | WHO COLUMN |
| TEMPLATE_ID | NUMBER(15) | No | |

The PAY_TMPLT_PTRN_ENT_USGS table is a translatable table for the rules table. It will include the default value and the exclusion value.

| COLUMN NAME | DATATYPE | MANDATORY | DESCRIPTION |
|---|---|---|---|
| RULE_ID | NUMBER(15) | Yes | |
| LANGUAGE | VARCHAR2(4 CHAR) | Yes | |
| OBJECT_VERSION_NUMBER | NUMBER(9) | No | |
| RULE_TXT | VARCHAR2(200 CHAR) | Yes | |
| DEFAULT_VALUE | VARCHAR2(200 CHAR) | No | |
| EXCLUSION_VALUE | VARCHAR2(200 CHAR) | No | |
| CREATED_BY | NUMBER(15) | Yes | WHO COLUMN |
| CREATION_DATE | DATE | Yes | WHO COLUMN |
| LAST_UPDATED_BY | NUMBER(15) | Yes | WHO COLUMN |
| LAST_UPDATE_DATE | DATE | Yes | WHO COLUMN |
| LAST_UPDATE_LOGIN | NUMBER(15) | No | WHO COLUMN |

The PAY_TMPLT_RULE_GROUPS table enables rules to be shown in groups in basic and detailed information pages. This table stores information grouping rules. The TEMPLATE_ID will include the corresponding template ID for the group in which we want this rule group to appear. The GROUP_LOCATION will have values of either "B" (basic) or "D" (detailed) to indicate which page of the wizard interface should include the rules in this group. The GROUP_TEXT column will store the group name that is used as the title of the group on the indicated page.

| COLUMN NAME | DATATYPE | MANDATORY | DESCRIPTION |
|---|---|---|---|
| RULE_GROUP_ID | NUMBER(15) | Yes | |
| BASE_RULE_GROUP_NAME | VARCHAR2(80) | No | |
| OBJECT_VERSION_NUMBER | NUMBER(9) | Yes | |
| CREATED_BY | NUMBER(15) | Yes | WHO COLUMN |
| CREATION_DATE | DATE | Yes | WHO COLUMN |
| LAST_UPDATED_BY | NUMBER(15) | Yes | WHO COLUMN |
| LAST_UPDATE_DATE | DATE | Yes | WHO COLUMN |
| LAST_UPDATE_LOGIN | NUMBER(15) | No | WHO COLUMN |
| TEMPLATE_ID | NUMBER(15) | No | |
| GROUP_LOCATION | VARCHAR2(30) | No | |

The PAY_TMPLT_RULE_GROUPS_TL:

| COLUMN NAME | DATATYPE | MANDATORY | DESCRIPTION |
|---|---|---|---|
| RULE_GROUP_ID | NUMBER(15) | Yes | |
| GROUP_TEXT | VARCHAR2(200 CHAR) | Yes | |
| LANGUAGE | VARCHAR2(4 CHAR) | Yes | |
| SOURCE_LANG | VARCHAR2(4 CHAR) | Yes | |
| OBJECT_VERSION_NUMBER | NUMBER(9) | Yes | |
| CREATED_BY | NUMBER(15) | Yes | WHO COLUMN |
| CREATION_DATE | DATE | Yes | WHO COLUMN |
| LAST_UPDATED_BY | NUMBER(15) | Yes | WHO COLUMN |
| LAST_UPDATE_DATE | DATE | Yes | WHO COLUMN |
| LAST_UPDATE_LOGIN | NUMBER(15) | No | WHO COLUMN |

The PAY_TMPLT_RULE_GR_USGS table is used to store the mappings of the groups to the rules. Based on the value seeded in the rule_value column (e.g., in response to user input received in response to a questionnaire), the specific entity row will be excluded or included. If the value seeded in the pay_tmplt_rules_TL table column EXCLUSION_VALUE matches the value seeded in this colun (RULE_VALUE), the entity (row) will be excluded from the template.

| COLUMN NAME | DATATYPE | MANDATORY | DESCRIPTION |
|---|---|---|---|
| RULE_GROUP_USAGE_ID | NUMBER(15) | Yes | |
| RULE_GROUP_ID | NUMBER(15) | Yes | |
| RULE_ID | NUMBER(15) | Yes | |
| OBJECT_VERSION_NUMBER | NUMBER(9) | Yes | |
| RULE_SEQUENCE | NUMBER(15) | No | |
| CREATED_BY | NUMBER(15) | Yes | WHO COLUMN |
| CREATION_DATE | DATE | Yes | WHO COLUMN |
| LAST_UPDATED_BY | NUMBER(15) | Yes | WHO COLUMN |
| LAST_UPDATE_DATE | DATE | Yes | WHO COLUMN |
| LAST_UPDATE_LOGIN | NUMBER(15) | No | WHO COLUMN |

The PAY_TMPLT_ENT_RULE_USGS table provides a mapping between the rules and the row instances tables. One rule can be linked to multiple row instances. The row instances will be excluded if the value provided by the user (e.g., via a response to a question in a questionnaire) is the same as the value in this table. There can be multiple combinations of exclusions depending n the user-provided value for a rule.

| COLUMN NAME | DATATYPE | MANDATORY | DESCRIPTION |
|---|---|---|---|
| ENT_RULE_USG_ID | NUMBER(30) | Yes | |
| RULE_ID | NUMBER(15) | No | |
| ENTITY_ID | NUMBER(15) | No | |
| RULE_VALUE | VARCHAR(200) | No | |
| OBJECT_VERSION_NUMBER | NUMBER(9) | No | |
| ENTITY_TYPE | VARCHAR2(30 CHAR) | No | |
| CREATED_BY | NUMBER(15) | Yes | WHO COLUMN |
| CREATION_DATE | DATE | Yes | WHO COLUMN |
| LAST_UPDATED_BY | NUMBER(15) | Yes | WHO COLUMN |
| LAST_UPDATE_DATE | DATE | Yes | WHO COLUMN |
| LAST_UPDATE_LOGIN | NUMBER(15) | No | WHO COLUMN |

The following tables are examples of tables that can be used to define template functional areas and patterns. In this examples, the value seeded in the rule_value column (e.g., in response to the user responding to a question in a questionnaire) will be used to determine whether a specific entity row is excluded or included. In particular, if the EXCLUSION_VALUE matches the values seeded in the RULE_VALUE column, the entity (row) will be excluded from the template.

The PAY_TMPLT_FUN_AREAS table defines functional areas.

| COLUMN NAME | DATATYPE | MANDATORY | DESCRIPTION |
|---|---|---|---|
| FUN_AREA_ID | NUMBER(15) | Yes | |
| OBJECT_VERSION_NUMBER | NUMBER(9) | No | |
| TEMPLATE_ID | NUMBER(15) | Yes | |
| FUN_AREA_NAME | VARCHAR2(20 CHAR) | Yes | |
| DEFAULT_PATTERN_ID | NUMBER(15) | No | |
| LEGISLATIVE_DATA_GROUP_ID | NUMBER(15) | No | |
| LEGISLATION_CODE | VARCHAR2(30 CHAR) | No | |
| CREATED_BY | NUMBER(15) | Yes | WHO COLUMN |
| CREATION_DATE | DATE | Yes | WHO COLUMN |
| LAST_UPDATED_BY | NUMBER(15) | Yes | WHO COLUMN |
| LAST_UPDATE_DATE | DATE | Yes | WHO COLUMN |
| LAST_UPDATE_LOGIN | NUMBER(15) | No | WHO COLUMN |

The PAY_TMPLT_DSGN_PTRN table can be used to define patterns.

| COLUMN NAME | DATATYPE | MANDATORY | DESCRIPTION |
|---|---|---|---|
| PATTERN_ID | NUMBER(15) | Yes | |
| PATTERN_NAME | VARCHAR2(20 CHAR) | Yes | |
| OBJECT_VERSION_NUMBER | NUMBER(9) | No | |
| LEGISLATIVE_DATA_GROUP_ID | NUMBER(15) | No | |
| LEGISLATION_CODE | VARCHAR2(30 CHAR) | No | |
| CREATED_BY | NUMBER(15) | Yes | WHO COLUMN |
| CREATION_DATE | DATE | Yes | WHO COLUMN |
| LAST_UPDATED_BY | NUMBER(15) | Yes | WHO COLUMN |
| LAST_UPDATE_DATE | DATE | Yes | WHO COLUMN |
| LAST_UPDATE_LOGIN | NUMBER(15) | No | WHO COLUMN |

The PAY_TMPLT_PTRN_SELECT table associates a particular pattern with different functional areas that have been seeded in the pay_tmplt_fun_areas table.

| COLUMN NAME | DATATYPE | MANDATORY | DESCRIPTION |
| --- | --- | --- | --- |
| PTRN_SELECT_ID | NUMBER(15) | Yes | |
| PATTERN_ID | NUMBER(15) | No | |
| FUN_AREA_ID | NUMBER(15) | No | |
| OBJECT_VERSION_NUMBER | NUMBER(15) | No | |
| LEGISLATIVE_DATA_GROUP_ID | NUMBER(15) | No | |
| LEGISLATION_CODE | NUMBER(15) | No | |
| CREATED_BY | NUMBER(15) | Yes | WHO COLUMN |
| CREATION_DATE | DATE | Yes | WHO COLUMN |
| LAST_UPDATED_BY | NUMBER(15) | Yes | WHO COLUMN |
| LAST_UPDATE_DATE | DATE | Yes | WHO COLUMN |
| LAST_UPDATE_LOGIN | NUMBER(15) | No | WHO COLUMN |

The PAY_TMPLT_PTRN_RULE_USGS table matches the pattern with the different rules from the pay_tmplt_rules table.

| COLUMN NAME | DATATYPE | MANDATORY | DESCRIPTION |
| --- | --- | --- | --- |
| PTRN_RULE_USAGE_ID | NUMBER(15) | Yes | |
| PATTERN_ID | NUMBER(15) | No | |
| RULE_ID | NUMBER(15) | No | |
| OBJECT_VERSION_NUMBER | NUMBER(9) | No | |
| CREATED_BY | NUMBER(15) | Yes | WHO COLUMN |
| CREATION_DATE | DATE | Yes | WHO COLUMN |
| LAST_UPDATED_BY | NUMBER(15) | Yes | WHO COLUMN |
| LAST_UPDATE_DATE | DATE | Yes | WHO COLUMN |
| LAST_UPDATE_LOGIN | NUMBER(15) | No | WHO COLUMN |

The PAY_TMPLT_PTRN_ENT_USGS table maps the different row_inst_id from pay_tmplt_row_inst with the patterns seeded in the pay_tmplt_dsgn_ptrn tables.

| COLUMN NAME | DATATYPE | MANDATORY | DESCRIPTION |
| --- | --- | --- | --- |
| PTRN_RULE_USAGE_ID | NUMBER(15) | Yes | |
| PATTERN_ID | NUMBER(15) | No | |
| ENTITY_ID | NUMBER(15) | No | |
| ENTITY_TYPE | VARCHAR2 (30 CHAR) | No | |
| OBJECT_VERSION_NUMBER | NUMBER(9) | No | |
| CREATED_BY | NUMBER(15) | Yes | WHO COLUMN |
| CREATION_DATE | DATE | Yes | WHO COLUMN |
| LAST_UPDATED_BY | NUMBER(15) | Yes | WHO COLUMN |
| LAST_UPDATE_DATE | DATE | Yes | WHO COLUMN |
| LAST_UPDATE_LOGIN | NUMBER(15) | No | WHO COLUMN |

Figure 6:
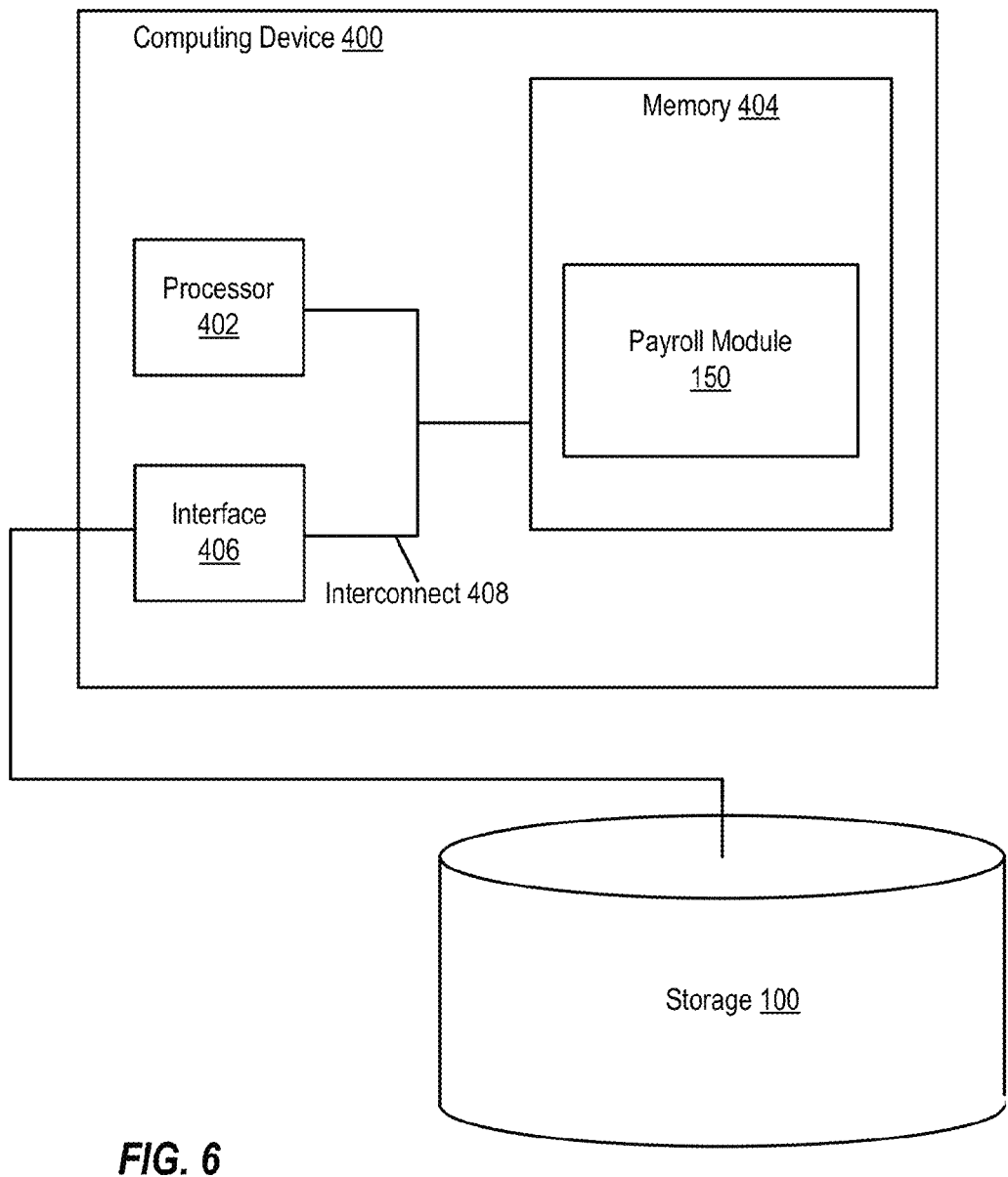
FIG. 6 is a block diagram of a computing device, illustrating how a payroll module that creates customized payroll element templates can be implemented in software in at least one embodiment.

FIG. 6 is a block diagram of a computing device 400 that illustrates how a payroll module 150 (e.g., such as payroll module 150 of FIG. 1) that creates customized payroll element templates can be implemented in software. Computing device 400 can be a personal computer, network appliance, server, personal digital assistant, mobile phone, storage controller (e.g., an array controller, tape drive controller, or hard drive controller), laptop computer, or the like. In general, computing device 400 is configured to execute software or otherwise provide appropriate functionality to customize predefined payroll element templates as described herein.

As illustrated, computing device 400 includes one or more processors 402 (e.g., microprocessors, Programmable Logic Devices (PLDs), or Application Specific Integrated Circuits (ASICs)) configured to execute program instructions stored in memory 404. Memory 4004 can include various types of Random Access Memory (RAM), Read Only Memory (ROM), Flash memory, Micro Electro-Mechanical Systems (MEMS) memory, magnetic core memory, and the like. Memory 404 can include both volatile and non-volatile memory.

Computing device 400 also includes one or more interfaces 406 (e.g., such as interfaces to a storage device, network, user output device such as a display device, user input device such as a mouse, touch screen, or keyboard, and the like). Processor 402, interface 406, and memory 404 are coupled to send and receive data and control signals by a bus or other interconnect.

Interface 406 can include a network interface to various networks and/or interfaces to various peripheral buses. For example, interface 406 can include a network interface via which user input requesting various configurations of a predefined payroll element template or the display of information about a predefined or customized payroll element template is received. Interface 406 can also include an interface to one or more storage devices (e.g., such as a storage device, like storage 100 of FIG. 1, storing one or more predefined and/or customized templates).

In this example, program instructions and data executable to implement all or part of payroll module 150 are stored in memory 404. The program instructions and data implementing payroll module 150 can be stored on various computer readable storage media such as memory 404. In some embodiments, such software is stored on a computer readable storage medium such as a Compact Disc (CD), Digital Versatile Disc (DVD), hard disk, optical disk, tape device, floppy disk, and the like). In order to be executed by processor 402, the instructions and data can be loaded into memory 404 from the other computer readable storage medium. The instructions and/or data can also be transferred to computing device 400 for storage in memory 404 via a network such as the Internet or upon a carrier medium.

Examples of Predefined Templates:

In one embodiment, the predefined templates (e.g., predefined templates 110 of FIG. 1) can be structured as follows. This example illustrates the record details that can be included in each of several different types of predefined templates. In this example, <BASE NAME> refers to the name given by the end user to the element type or object. This base name can also be used to create the balances, formulas, and the like. In some cases this will be the name given to the element, and in some cases it will be pre-fixed to the record name (e.g., "My Salary" name will be pre-fixed to the formula "Flat Amount"; such that the record name becomes "My Salary Flat Amount").

In the following example templates, the rules included in each template can be used for two purposes: to exclude a record and to create a default value. For example, the element "Flat Amount Special Feature" can include the rule {RULE: Total Reached VALUE: N}. This means if the user chooses not to have the total amount feature (as indicated by the user's answer to a corresponding question in a questionnaire) then the special feature element will not be created. As a result any child or referenced records of the special feature element will be excluded as well.

As another example, {RULE:Over Ride DEFAULT:N} on ADDITIONAL ENTRY ALLOWED FLAG. This means the answer to the question will be used to default the given attribute. Also the DEFAULT indicates what would be the default answer for the given question. Please note that this default will be hard coded within the given record. Hence even if a rule is excluded by another rule then the default on the record still remains.

Example Flat Amount Element Predefined Template:

| Element Types | |
|---|---|
| CLASSIFICATION NAME | {Chosen classification} |
| ADDITIONAL ENTRY ALLOWED FLAG | {RULE:Over Ride DEFAULT:N} |
| ADJUSTMENT ONLY FLAG | N |
| CLOSED FOR ENTRY FLAG | N |
| ELEMENT NAME | <BASE NAME> |
| INDIRECT ONLY FLAG | N |
| MULTIPLE ENTRIES ALLOWED FLAG | {RULE:Multiple Entries DEFAULT:Y} |
| STARTING TIME DEF | {RULE: Hire Process DEFAULT:On Hire Date} |
| ENDING TIME DEF | {RULE: Termination Process DEFAULT:On Final Close Date} |
| PROCESS IN RUN FLAG | Y |
| RELATIVE PROCESSING PRIORITY | 0 |
| PROCESSING TYPE | {RULE:Recurring Or NonRecurring VALUE:N} |
| STANDARD LINK FLAG | {RULE:Availability Rule DEFAULT:N} |
| INPUT CURRENCY CODE | {RULE:Specify Currency DEFAULT:<Currency code for the given country>} |
| OUTPUT CURRENCY CODE | {RULE:Output Currency DEFAULT:<Currency of the given country>} |
| ONCE EACH PERIOD FLAG | {RULE:Once Per Period DEFAULT:N} |
| USE AT REL LEVEL | {RULE: Process Rel Level DEFAULT:N} |
| USE AT TERM LEVEL | {RULE: Process Term Level DEFAULT:N} |
| USE AT ASG LEVEL | {RULE: Process Asg Level DEFAULT:Y} |
| PRORATION FORMULA | |
| PRORATION GROUP | {RULE: Proration Group DEFAULT:PRORATION_GROUP} |
| TIME DEFINITION TYPE | |
| TIME DEFINITION | |
| RECALC EVENT GROUP | {RULE:Retro Group DEFAULT:RETRO_GROUP} |
| REPORTING NAME | |
| ITERATIVE FLAG | {RULE:Iterative Information DEFAULT:N} |
| ITERATIVE FORMULA | DEFAULT_GROSSUP |
| ITERATIVE PRIORITY | 10 |
| PROCESS MODE | {RULE:Process Period DEFAULT:S} |
| EXCLUSION RULE | |
| CLASSIFICATION NAME | {Chosen classification} |
| ADDITIONAL ENTRY ALLOWED FLAG | N |
| ADJUSTMENT ONLY FLAG | N |
| CLOSED FOR ENTRY FLAG | N |
| ELEMENT NAME | <BASE NAME> Special Feature |
| INDIRECT ONLY FLAG | Y |
| MULTIPLE ENTRIES ALLOWED FLAG | Y |
| STARTING TIME DEF | {RULE: Hire Process DEFAULT:On Hire Date} |
| ENDING TIME DEF | {RULE: Termination Process DEFAULT:On Final Close Date} |
| PROCESS IN RUN FLAG | Y |
| RELATIVE PROCESSING PRIORITY | 50 |
| PROCESSING TYPE | N |
| STANDARD LINK FLAG | N |
| INPUT CURRENCY CODE | {RULE:Specify Currency DEFAULT:<Currency code for the given country>} |
| OUTPUT CURRENCY CODE | {RULE:Output Currency DEFAULT:<Currency of the given country>} |
| ONCE EACH PERIOD FLAG | N |
| USE AT REL LEVEL | {RULE: Process Rel Level DEFAULT:N} |

-continued

| Element Types | |
|---|---|
| USE AT TERM LEVEL | {RULE: Process Term Level DEFAULT:N} |
| USE AT ASG LEVEL | {RULE: Process Asg Level DEFAULT:Y} |
| PRORATION FORMULA | |
| PRORATION GROUP | |
| TIME DEFINITION TYPE | |
| TIME DEFINITION | |
| RECALC EVENT GROUP | |
| REPORTING NAME | SF |
| ITERATIVE FLAG | |
| ITERATIVE FORMULA | |
| ITERATIVE PRIORITY | |
| PROCESS MODE | N |
| EXCLUSION RULE | {RULE: Total Reached VALUE: N} |

| Element Type Usages | | | |
|---|---|---|---|
| ELEMENT TYPE | <BASE NAME> | <BASE NAME> | <BASE NAME> |
| INCLUSION FLAG | N | N | N |
| RUN TYPE NAME | Separate Payment | Standard | Process Separate |

-continued

| Element Type Usages | | | |
|---|---|---|---|
| EXCLUSION RULE | {RULE:Process Period VALUE: S} | {RULE:Process Period VALUE: N} | {RULE:Process Period VALUE: P} |

| Input Values | | | | | |
|---|---|---|---|---|---|
| ELEMENT TYPE EXCLUSION RULE | <BASE NAME> | <BASE NAME> | <BASE NAME> | <BASE NAME> {RULE: Process Period VALUE: NOT S} | <BASE NAME> {RULE: Process Period VALUE: NOT N} |
| DISPLAY SEQUENCE | 1 | 2 | 3 | 21 | 22 |
| GENERATE DB ITEMS FLAG | Y | Y | N | N | N |
| HOT DEFAULT FLAG | N | N | N | N | N |
| MANDATORY FLAG | N | N | N | Y | Y |
| NAME | Pay Value | Amount | Jurisdiction | Process Seperate | Separate Payment |
| UOM | M | M | C | C | C |
| LOOKUP TYPE | | | | YES_NO | YES_NO |
| DEFAULT VALUE | | | | N | N |

| Input Values | | | | |
|---|---|---|---|---|
| ELEMENT TYPE EXCLUSION RULE | <BASE NAME> {RULE: Total Reached VALUE: N} | <BASE NAME> | <BASE NAME> | <BASE NAME> |
| DISPLAY SEQUENCE | 20 | 23 | 24 | 9 |
| GENERATE DB ITEMS FLAG | N | N | N | Y |
| HOT DEFAULT FLAG | N | N | N | N |
| MANDATORY FLAG | Y | Y | Y | N |
| NAME | Maximum Amount | Deduction Processing | Reduce Regular | Low Gross |
| UOM | M | C | C | M |

-continued

| LOOKUP TYPE | | DEDUCTION_PROCESSING | | YES_NO | |
|---|---|---|---|---|---|
| DEFAULT VALUE | | {RULE: Deduction Types DEFAULT: A} | | {RULE: Reduce Regular DEFAULT: N} | {RULE: Iterative Information DEFAULT: N} |

| Input Values |
|---|

| | | | | | |
|---|---|---|---|---|---|
| ELEMENT TYPE EXCLUSION RULE | <BASE NAME> | <BASE NAME> | <BASE NAME> | <BASE NAME> | <BASE NAME> |
| DISPLAY SEQUENCE | 10 | 11 | 12 | 13 | 14 |
| GENERATE DB ITEMS FLAG | Y | Y | Y | Y | Y |
| HOT DEFAULT FLAG | N | N | N | N | N |
| MANDATORY FLAG | N | N | Y | N | Y |
| NAME | High Gross | Reminder | To Within | Additional Amount | Method |
| UOM | M | M | M | M | M |
| LOOKUP TYPE | | | | | ITERATIVE_METHOD |
| DEFAULT VALUE | {RULE: Iterative Information DEFAULT: N} | {RULE: Iterative Information DEFAULT: N} | {RULE: Iterative Information DEFAULT: N} | Interpolation | Interpolation |

| Input Values |
|---|

| | | |
|---|---|---|
| ELEMENT TYPE | <BASE NAME> Special Feature | <BASE NAME> Special Feature |
| EXCLUSION RULE | {RULE: Total Reached VALUE: N} | {RULE: Total Reached VALUE: N} |
| DISPLAY SEQUENCE | 1 | 3 |
| GENERATE DB ITEMS FLAG | Y | N |
| HOT DEFAULT FLAG | N | N |
| MANDATORY FLAG | N | N |
| NAME | Pay Value | Clear Accrued |
| UOM | M | M |
| LOOKUP TYPE | | |
| DEFAULT VALUE | | |

| Balance Types |
|---|

| | | | |
|---|---|---|---|
| ASSIGNMENT REMUNERATION FLAG | N | N | N |
| BALANCE NAME | <BASE NAME> | <BASE NAME> Accrued | <BASE NAME> Negative Earning |
| BALANCE UOM | M | M | M |
| CURRENCY CODE | {RULE: Output Currency DEFAULT:< Currency of the given country>} | {RULE: Output Currency DEFAULT:< Currency of the given country>} | {RULE: Output Currency DEFAULT:< Currency of the given country>} |
| COMMENTS | Primary balance for Flat Amount Earnings. | Accrued balance for Flat Amount. | Negative Earning balance for Flat Amount. |
| REPORTING NAME | | Accrued | Accrued |
| CATEGORY NAME | Earnings | Wages | Wages |

| Balance Types | | |
|---|---|---|
| BASE BALANCE TYPE | <BASE NAME> | <BASE NAME> |
| INPUT VALUE | Pay Value | |
| EXCLUSION RULE | {RULE: Total Reached VALUE: N} | {RULE: Total Reached VALUE: N} |

| Balance Feeds | | | |
|---|---|---|---|
| ELEMENT NAME | <BASE NAME> | <BASE NAME> Special Feature | <BASE NAME> |
| INPUT VALUE | Pay Value | Clear Accrued | Pay Value |
| BALANCE NAME | <BASE NAME> | <BASE NAME> Accrued | <BASE NAME> Accrued |
| SCALE | 1 | 1 | 1 |
| EXCLUSION RULE | | {RULE: Total Reached VALUE: N} | {RULE: Total Reached VALUE: N} |

| Defined Balances | | |
|---|---|---|
| BALANCE TYPE | DIMENSION | EXCLUSION RULE |
| Flat Amount | Payroll Relationship Calendar Year To Date | |
| Flat Amount | Payroll Relationship Calendar Quater To Date | |
| Flat Amount | Payroll Relationship Calendar Month To Date | |
| Flat Amount | Payroll Relationship Inception To Date | {RULE: Total Reached VALUE: N} |
| Flat Amount | Payroll Relationship Pay Run | |
| Flat Amount | Payroll Term Calendar Year To Date | {RULE:Processing Level VALUE: R} |
| Flat Amount | Payroll Term Inception To Date | {RULE:Processing Level VALUE: R} {RULE: Total Reached VALUE: N} |
| Flat Amount | Payroll Term Pay Run | {RULE:Processing Level VALUE: R} |
| Flat Amount | Payroll Assignment Calendar Year To Date | {RULE:Processing Level VALUE: NOT A} |
| Flat Amount | Payroll Assignment Inception To Date | {RULE:Processing Level VALUE: NOT A} {RULE: Total Reached VALUE: N} |
| Flat Amount | Payroll Assignment Pay Run | {RULE:Processing Level VALUE: NOT A} |
| Flat Amount | Payment | |
| Flat Amount | Element Entry Inception To Date | {RULE: Total Reached VALUE: N} |

| Fast Formulas | |
|---|---|
| FORMULA NAME | _FLAT_AMOUNT_EARN |
| DESCRIPTION | Formula for Flat Amount Template |
| FORMULA TEXT | /******************************************************************* FORMULA NAME: _FLAT_AMOUNT_EARN FORMULA TYPE: Payroll DESCRIPTION: Formula for Flat Amount for Earning Template for International Payroll. Returns pay value (Amount); Formula Results :   flat_amount   Direct Result for Earnings Amount.   clear_accrued  Indirect Result for Accrued Amount. |

| Fast Formulas |
|---|
| STOP_ENTRY To indicate whether the entry needs to be ended.<br>mesg Warning message will be issued for this assignment.<br>\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*/<br>/\* Database Item Defaults \*/<br>DEFAULT FOR flat_amount is 0<br>DEFAULT FOR additional_amount is 0<br>DEFAULT FOR maximum_amount is 0<br>DEFAULT FOR mesg is 'NOT ENTERED'<br>DEFAULT FOR <BASE NAME>_ACCRUED_CORE_ASG_ITD IS 0<br>DEFAULT FOR <BASE NAME>_ACCRUED_CORE_ASG_ITD IS 0<br>DEFAULT FOR <BASE NAME>_ACCRUED_CORE_TRM_ITD IS 0<br>DEFAULT FOR <BASE NAME>_ACCRUED_CORE_PRS_ITD IS 0<br>DEFAULT FOR <BASE NAME>_CORE_EE_ITD IS 0<br>DEFAULT FOR <BASE NAME>_EMPLOYEMENT_LEVEL IS 'A'<br>default for prorate_start is '01-JAN-1900' (date)<br>default for prorate_end is '01-JAN-1900' (date)<br>DEFAULT FOR PAY_PROC_PERIOD_START_DATE IS '0001/01/01 00:00:00' (DATE)<br>DEFAULT FOR PAY_PROC_PERIOD_END_DATE IS '0001/01/02 00:00:00'(Date)<br>/\* Inputs \*/<br>INPUTS ARE Amount (number),<br>    additional_amount (number),<br>    maximum_amount (number),<br>    prorate_start (date),<br>    prorate_end (date)<br>/\* Declarations \*/<br>get_accrued_value = 0<br>accrued_value = 0<br>clear_accrued = 0<br>/\* Amount to be derived from the given Pay Source by using the Get_Amount function. \*/<br>flat_amount = Get_Amount( ) + additional_amount<br>l_start_date = GREATEST(PAY_PROC_PERIOD_START_DATE, <BASE NAME>_START_DATE, prorate_start)<br>l_end_date = LEAST(PAY_PROC_PERIOD_END_DATE, <BASE NAME>_END_DATE, prorate_end)<br>l_duration = (DAYS_BETWEEN( PAY_PROC_PERIOD_END_DATE , PAY_PROC_PERIOD_START_DATE)+1)<br>/\* Calculations \*/<br>/\* Proration Calculation (if enabled) \*/<br>IF (prorate_start WAS NOT DEFAULTED) THEN<br>  (<br>    flat_amount = flat_amount \* (DAYS_BETWEEN( l_end_date , l_start_date)+1)/<br>       l_duration<br>  )<br>/\* Total Reached Check (if enabled) \*/<br>IF (maximum_amount WAS NOT DEFAULTED) THEN<br>  (<br>    /\* Use the appropriate balance based on the employment level for the given element.\*/<br>    IF (<BASE NAME>_EMPLOYEMENT_LEVEL = 'A') THEN<br>      (<br>        get_accrued_value = <BASE NAME>_ACCRUED_CORE_ASG_ITD<br>      )<br>    ELSE IF (<BASE NAME>_EMPLOYEMENT_LEVEL = 'T') THEN<br>      (<br>        get_accrued_value = <BASE NAME>_ACCRUED_CORE_TRM_ITD<br>      )<br>    ELSE |

| Fast Formulas |
|---|
| ( |
|     get_accrued_value = <BASE NAME>_ACCRUED_CORE_PSR_ITD |
|     ) |
|     base_entry_itd = <BASE NAME>_EE_ITD |
|     IF base_entry_itd = 0 AND get_accrued_value > 0 THEN |
|     ( |
|         clear_accrued = get_accrued_value*−1 |
|         accrued_value = 0 |
|     ) |
|     ELSE |
|     ( |
|         accrued_value = get_accrued_value |
|     ) |
|     IF (maximum_amount <= flat_amount + accrued_value) then |
|     ( |
|         flat_amount = maximum_amount − accrued_value |
|         clear_accrued = (get_accrued_value + flat_amount) * −1 |
|         mesg = mesg\|\|'Earnings element entry has stopped' |
|         \|\|' as the Maximum Amount has been reached.' |
|         STOP_ENTRY = 'Y' |
|     ) |
| ) |
| /* Returns */ |
| RETURN flat_amount , |
|         clear_accrued , |
|         STOP_ENTRY , |
|         mesg |
| /* End Formula Text */ |
| EXCLUSION RULE |

| Formula Rules | | | | | | | | |
|---|---|---|---|---|---|---|---|---|
| SHADOW ELEMENT TYPE | <BASE NAME> | <BASE NAME> | <BASE NAME> | <BASE NAME> | | | | |
| FORMULA | <BASE NAME>_FLAT_AMOUNT_EARN | <BASE NAME>_FLAT_AMOUNT_EARN | <BASE NAME>_FLAT_AMOUNT_EARN | <BASE NAME>_FLAT_AMOUNT_EARN | | | | |
| ELEMENT TYPE | | <BASE NAME> Special Feature | <BASE NAME> | | | | | |
| RESULT NAME | flat_amount | clear_accrued | STOP_ENTRY | mesg | | | | |
| INPUT VALUE | Pay Value | Clear Accrued | | | | | | |
| RESULT RULE TYPE | D | I | S | M | | | | |
| EXCLUSION RULE | | | | | | | | |

| Iterative Rules | | | | | |
|---|---|---|---|---|---|
| ELEMENT | <BASE NAME> | <BASE NAME> | <BASE NAME> | <BASE NAME> | <BASE NAME> |
| FORMULA | DEFAULT_GROSSUP | DEFAULT_GROSSUP | DEFAULT_GROSSUP | DEFAULT_GROSSUP | DEFAULT_GROSSUP |
| RETURN NAME | ADDITIONAL_AMOUNT | HIGH_GROSS | LOW_GROSS | REMAINDER | STOPPER |
| TYPE | A | A | A | A | S |
| INPUT VALUE | Additional Amount | High Gross | Low Gross | Remainder | |
| SEVERITY | | | | | |
| EXCLUSION RULE | | | | | |

| Retro Component Usages | |
|---|---|
| CREATOR TYPE | ET |
| CREATOR | Flat Amount |
| RETRO COMPONENT | Replacement |
| DEFAULT COMPONENT | Y |
| REPROCESS TYPE | R |

Example Days×Rate Predefined Template:

| Element Types | |
|---|---|
| CLASSIFICATION NAME | {Chosen classification} |
| ADDITIONAL ENTRY ALLOWED FLAG | {RULE:Over Ride DEFAULT:N} |
| ADJUSTMENT ONLY FLAG | N |
| CLOSED FOR ENTRY FLAG | N |
| ELEMENT NAME | Days × Rate |
| INDIRECT ONLY FLAG | N |
| MULTIPLE ENTRIES ALLOWED FLAG | {RULE:Multiple Entries DEFAULT:Y} |
| STARTING TIME DEF | {RULE: Hire Process DEFAULT:On Hire Date} |
| ENDING TIME DEF | {RULE: Termination Process DEFAULT:On Final Close Date} |
| PROCESS IN RUN FLAG | Y |
| RELATIVE PROCESSING PRIORITY | 0 |
| PROCESSING TYPE | {RULE:Recurring Or NonRecurring VALUE:N} |
| STANDARD LINK FLAG | {RULE:Availability Rule DEFAULT:N} |
| INPUT CURRENCY CODE | {RULE:Specify Currency DEFAULT:<Currency code for the given country>} |
| OUTPUT CURRENCY CODE | {RULE:Output Currency DEFAULT:<Currency of the given country>} |
| ONCE EACH PERIOD FLAG | {RULE:Once Per Period DEFAULT:N} |
| USE AT REL LEVEL | {RULE: Process Rel Level DEFAULT:N} |
| USE AT TERM LEVEL | {RULE: Process Term Level DEFAULT:N} |
| USE AT ASG LEVEL | {RULE: Process Asg Level DEFAULT:Y} |
| PRORATION FORMULA | _Days_X_Rate_Proration |
| PRORATION GROUP | {RULE:Proration DEFAULT:N} |
| TIME DEFINITION TYPE | ? |
| TIME DEFINITION | ? |
| RECALC EVENT GROUP | {RULE:Retro DEFAULT:N} |
| REPORTING NAME | |
| ITERATIVE FLAG | {RULE:Iterative Information DEFAULT:N} |
| ITERATIVE FORMULA | DEFAULT_GROSSUP |
| ITERATIVE PRIORITY | 10 |
| PROCESS MODE | {RULE:Process Period DEFAULT:S} |

| Element Type Usages | | | | |
|---|---|---|---|---|
| ELEMENT TYPE | Days × Rate | Days × Rate | Days × Rate | Days × Rate |
| INCLUSION FLAG | N | N | N | N |
| RUN TYPE NAME | Separate Payment | Process Separately | Process Separately - Non Periodic | Separate Payment - Non Periodic |
| EXCLUSION RULE | {RULE: Recurring Or NonRecurring VALUE:R} | {RULE: Recurring Or NonRecurring VALUE:R} | {RULE: Recurring Or NonRecurring VALUE:N} | {RULE: Recurring Or NonRecurring VALUE:N} |

| Fast Formulas | |
|---|---|
| FORMULA NAME | _DAYS_X_RATE |
| DESCRIPTION | Formula for Days X Rate Template |
| FORMULA TEXT | /************************************************** *************************** FORMULA NAME: DAYS_X_RATE |

| Fast Formulas |
|---|

FORMULA TYPE: Payroll
DESCRIPTION: Formula for Days X Rate element where Days must be input, Multiple defaults to 1 if not input, and Rate is determined by one of the following, in order of preference:
    1) Entry of "Rate" input value
    2) Salary Admin "Pay Basis" information
--
INPUTS:    Days
             Rate
             Multiple
--
Change History
--
*****************************************************
Formula Results :
   earnings_amount   Direct Result for Earnings Pay Value.
   mesg   Message indicating that this earnings will be deleted for this assignment.
*****************************************************/
/* ===== Alias Section Begin ====== */
ALIAS HR_WORK_SCHEDULE AS Work_Schedule
ALIAS HR_TIMECARD_REQUIRED AS Timecard_Required
/* ===== Alias Section End ====== */
/* ===== Defaults Section Begin ===== */
DEFAULT FOR   PAY_PROC_PERIOD_START_DATE   is '0001/01/01 00:00:00' (DATE)
DEFAULT FOR   PAY_PROC_PERIOD_END_DATE   is '0001/01/02 00:00:00' (DATE)
DEFAULT FOR   ASG_SALARY   is 0
DEFAULT FOR   ASG_SALARY_BASIS   is 'NOT ENTERED'
   /* IF Work_Schedule is not entered, this is assumed that employee works
      8 hours a day and 5 days a week */
DEFAULT FOR   Work_Schedule   is '1 Schedule: 8-8-8-8-8-0-0'
DEFAULT FOR   Timecard_Required   is 'N'
DEFAULT FOR   Includes_Rest_Days   is 'N'
DEFAULT FOR   Days   is 0
DEFAULT FOR   Rate   is 0
DEFAULT FOR   Multiple   is 1
DEFAULT FOR   ASG_FREQ_CODE   is 'W'
DEFAULT FOR   ASG_HOURS   is 40
/* ===== Defaults Section End ===== */
/* ===== Inputs Section Begin ===== */
Inputs are   Days,
           Rate,
           Multiple
/* ===== Inputs Section End ===== */
/* =====Local variables ===== */
local_dummy_class_name = 'NONE'
local_daily_salary = 0
local_gross_earnings = GROSS_EARNINGS_ASG_RUN
local_ytd_gross_earnings = GROSS_EARNINGS_ASG_YTD
mesg = 'NOT ENTERED'
/* ===== CALCULATION SECTION BEGIN ===== */
   /* Use pay basis input value id and basis to find rate. If
      ASG_HOURLY_SALARY is the amount, then can call
      Convert_Period_Type */
   IF ASG_SALARY_BASIS = 'DAILY' THEN
   (
     local_daily_salary = ASG_SALARY
   )
   ELSE
   (
     local_daily_salary =   Convert_Period_Type(

| Fast Formulas |
| --- |

```
                                Work_Schedule,
                                ASG_HOURS,
                                ASG_SALARY,
                                ASG_SALARY_BASIS,
                                'DAILY',
PAY_PROC_PERIOD_START_DATE,
PAY_PROC_PERIOD_END_DATE,
                                ASG_FREQ_CODE)
        )
    IF Rate WAS DEFAULTED THEN
    (
        calc_rate = local_daily_salary
        /*IF ASG_SALARY_BASIS = 'DAILY' THEN
        (
            calc_rate = ASG_SALARY
        )
        ELSE
        (
            calc_rate = Convert_Period_Type(
                                Work_Schedule,
                                ASG_HOURS,
                                ASG_SALARY,
                                ASG_SALARY_BASIS,
                                'DAILY',
PAY_PROC_PERIOD_START_DATE,
PAY_PROC_PERIOD_END_DATE,
                                ASG_FREQ_CODE)
           )*/
    )
    ELSE
    (
        /* Rate is entered */
        calc_rate = Rate
    )
/* ---- Now find Multiple ----- */
    calc_multiple = Multiple
/* ---- Now find Days ----- */
    tot_days_in_pay_period = Days_in_Pay_Period( )
    IF ASG_SALARY WAS DEFAULTED THEN
    (
          LOCAL_DAILY_SALARY =
FIXED_EARNINGS_ASG_GRE_RUN /
tot_days_in_pay_period
    )
    IF Days WAS DEFAULTED THEN
    (
        IF Timecard_Required = 'Y' THEN
        (
            calc_days = 0
            tot_work_days = 0
            mesg =
GET_MESG('PAY','PAY_TIMECARD_NOT_FOUND',
'BASE_NAME','<BASE_NAME>')
            RETURN mesg
        )
        ELSE
        (
            IF Includes_Rest_days = 'Y' THEN
            (
                calc_days       = tot_days_in_pay_period
                tot_work_days   = tot_days_in_pay_period
            )
            ELSE
            (
                calc_days =
Work_Sch_Total_Hours_or_Days(
Work_Schedule,
PAY_PROC_PERIOD_START_DATE,
PAY_PROC_PERIOD_END_DATE,
                                                'DAYS')
                tot_work_days = calc_days
            )
        )
    )
    ELSE
    (
        /* Use entered Days. */
```

| Fast Formulas |
|---|
| calc_days = Days<br>IF Includes_Rest_days = 'Y' THEN<br>(<br>    tot_work_days = tot_days_in_pay_period<br>)<br>ELSE<br>(<br>    tot_work_days =<br>Work_Sch_Total_Hours_or_Days(<br>Work_Schedule,<br>PAY_PROC_PERIOD_START_DATE,<br>PAY_PROC_PERIOD_END_DATE,<br>    'DAYS')<br>)<br>    earnings_amount = (calc_days * calc_multiple * calc_rate) *<br>    (tot_days_in_pay_period / tot_work_days)<br>/* ===== CALCULATION SECTION END ===== */<br>/* ===== Returns Section Begin ===== */<br>earnings_days = calc_days<br>  RETURN  earnings_amount<br>    , earnings_days<br>/* ===== Returns Section End ===== */<br>/* End Formula Text */ |

| | |
|---|---|
| FORMULA NAME | _DAYS_X_RATE_PRORATION |
| DESCRIPTION | Formula for Days X Rate Proration Template |
| FORMULA TEXT | /*****************************************<br>*******<br>Description : Formula to calculate pro rated amounts.<br>DISCLAIMER : This formula is strictly for example or prototype<br>   purposes only. You should update the formula to meet your particular<br>   requirements. This formula may contain certain hard<br>   coded values to simplify the use of formulas for proration. A typical example<br>   of proration would be when a new employee starts work in the middle of a<br>   monthly payroll period and your payroll department makes a pro-rata payment<br>   to reflect the proportion of monthly pay to which the employee is entitled.<br>   The prototype formula supplied is only designed to work for payroll<br>   calculations involving proration and should not be used for any other purpose.<br>   Any use of the formula is subject to the terms of the Oracle license agreement<br>   for the HRMS programs and documentation.<br>***************************************<br>*******/<br>default for prorate_start is '01-JAN-1900' (date)<br>default for prorate_end is '01-JAN-1900' (date)<br>default for   amount is 0.0<br>inputs are   prorate_start (date),<br>          prorate_end (date),<br>          annual_amount (number)<br>/<br>   Prorate_start and prorate_end dates are passed from the payroll engine. These<br>   dates basically represent the dates on which the changes occur in the<br>   deduction amount during the pay period.<br>annual_amount is an input value<br>   created in the element to which this formula will be tied. Here the<br>   assumption is that the user enters the annual deduction amount in the<br>   input value.<br>**/ |

| Fast Formulas |
|---|
| l_amount = annual_amount<br>message = 'Proration Start Date ' \|\|<br>TO_CHAR(prorate_start, 'DD-MON-YYYY')<br>IF (prorate_start was defaulted) then<br>(<br>/<br>    prorate_start date is defaulted when no pro ration occurs. Therefore we<br>    should just return the annual deduction amount divided by 12.<br>/<br>    l_amount = l_amount / 12<br>    return l_amount, message<br>)<br>else<br>(<br>    l_days = days_between(prorate_end , prorate_start) + 1<br>/<br>    l_days stores the number of days between prorate start and prorate<br>    end dates<br>/<br>    l_days_in_fiscal_year = 365<br>/<br>    It is another assumption that a year contains 365 days. Please change<br>    this assumption to take care of leap year. This formula will not work<br>    properly in a leap year.<br>/<br>    l_amount = (l_amount * l_days) / l_days_in_fiscal_year<br>/<br>    In the above calculation, since l_amount contains the annual deduction amount,<br>    it is divided by 365 days of the year to get the deduction amount per day.<br>    This amount is then multiplied by the number of days in question to get<br>    the proper deduction amount<br>/<br>return l_amount, message<br>) |

| Formula Rules | | |
|---|---|---|
| SHADOW ELEMENT TYPE FORMULA | Days X Rate _DAYS_X_RATE | Days X Rate _DAYS_X_RATE |
| ELEMENT TYPE | Days X Rate | Days X Rate |
| EXCLUSION RULE | | |
| RESULT NAME | earnings_amount | earnings_days |
| INPUT VALUE | Pay Value | Days |
| RESULT RULE TYPE | D | D |

| Balance Types | | |
|---|---|---|
| EXCLUSION RULE ASSIGNMENT | N | N |
| REMUNERATION FLAG | | |
| BALANCE NAME | Days X Rate | Days X Rate Days |
| BALANCE UOM | M | ND |
| CURRENCY CODE | {RULE:Output Currency DEFAULT:<Currency of the given country>} | {RULE:Output Currency DEFAULT:<Currency of the given country>} |
| COMMENTS | Primary balance for Days X Rate Earnings. | Days balance for Days X Rate Earnings. |

| Balance Types | | |
|---|---|---|
| REPORTING NAME | | Days |
| CATEGORY NAME | Earnings | Earnings Days |
| BASE BALANCE TYPE | | Days X Rate |
| INPUT VALUE | Pay Value | |

| Input Values | | | | | |
|---|---|---|---|---|---|
| ELEMENT TYPE | Days X Rate | Days X Rate | Days X Rate | Days X Rate | Days X Rate |
| EXCLUSION RULE | | | | | |
| EXCLUSION RULE VALUE | | | | | |
| DISPLAY SEQUENCE | 1 | 2 | 3 | 4 | 5 |
| GENERATE DB ITEMS FLAG | Y | Y | Y | Y | Y |
| HOT DEFAULT FLAG | N | N | N | N | N |
| MANDATORY FLAG | X | N | N | N | X |

-continued

| NAME | Pay Value | Days | Rate | Multiple | Jurisdiction |
|---|---|---|---|---|---|
| UOM | M | ND | N | N | C |
| LOOKUP TYPE | | | | | |
| DEFAULT VALUE | | | | | |
| DEFAULT VALUE COLUMN | | | | | |

| Input Values | |
|---|---|
| ELEMENT TYPE | Days X Rate |
| EXCLUSION RULE | |
| EXCLUSION RULE VALUE | |
| DISPLAY SEQUENCE | 11 |
| GENERATE DB ITEMS FLAG | Y |
| HOT DEFAULT FLAG | N |
| MANDATORY FLAG | N |
| NAME | Includes Rest Days |
| UOM | C |
| LOOKUP TYPE | YES_NO |
| DEFAULT VALUE | |
| DEFAULT VALUE COLUMN | |

| Balance Feeds | | |
|---|---|---|
| INPUT VALUE | Pay Value | Days |
| BALANCE TYPE | Days X Rate | Days X Rate Days |
| EXCLUSION RULE | | |
| SCALE | 1 | 1 |
| BALANCE NAME | | |

| Defined Balances | | |
|---|---|---|
| BALANCE TYPE | DIMENSION | EXCLUSION RULE |
| Days X Rate | _CORE_PRS_RUN | |
| Days X Rate | _CORE_PRS_PY_PTD | |
| Days X Rate | _CORE_PRS_MTD | |
| Days X Rate | _CORE_PRS_QTD | |
| Days X Rate | _CORE_PRS_YTD | |
| Days X Rate | _CORE_PRS_TU_RUN | |
| Days X Rate | _CORE_PRS_TU_PY_PTD | |
| Days X Rate | _CORE_PRS_TU_YTD | |
| Days X Rate | _CORE_ASG_RUN | |
| Days X Rate | _CORE_ASG_PY_PTD | |
| Days X Rate | _CORE_ASG_MTD | |
| Days X Rate | _CORE_ASG_QTD | |
| Days X Rate | _CORE_ASG_YTD | |
| Days X Rate | _CORE_ASG_TU_RUN | |
| Days X Rate | _CORE_ASG_TU_PY_PTD | |
| Days X Rate | _CORE_ASG_TU_YTD | |
| Days X Rate Days | _CORE_PRS_RUN | |
| Days X Rate Days | _CORE_PRS_PY_PTD | |
| Days X Rate Days | _CORE_PRS_MTD | |
| Days X Rate Days | _CORE_PRS_QTD | |
| Days X Rate Days | _CORE_PRS_YTD | |
| Days X Rate Days | _CORE_PRS_TU_RUN | |
| Days X Rate Days | _CORE_PRS_TU_PY_PTD | |
| Days X Rate Days | _CORE_PRS_TU_YTD | |
| Days X Rate Days | _CORE_ASG_RUN | |
| Days X Rate Days | _CORE_ASG_PY_PTD | |
| Days X Rate Days | _CORE_ASG_MTD | |
| Days X Rate Days | _CORE_ASG_QTD | |
| Days X Rate Days | _CORE_ASG_YTD | |
| Days X Rate Days | _CORE_ASG_TU_RUN | |
| Days X Rate Days | _CORE_ASG_TU_PY_PTD | |
| Days X Rate Days | _CORE_ASG_TU_YTD | |

| Retro Component Usages | |
|---|---|
| CREATOR TYPE | ET |
| CREATOR | Days X Rate |
| RETRO COMPONENT | Replacement |
| DEFAULT COMPONENT | Y |
| REPROCESS TYPE | R |

Example Hours×Rate Predefined Template:

| Element Types | |
|---|---|
| CLASSIFICATION NAME | {Chosen classification} |
| ADDITIONAL ENTRY ALLOWED FLAG | {RULE:Over Ride DEFAULT:N} |
| ADJUSTMENT ONLY FLAG | N |
| CLOSED FOR ENTRY FLAG | N |
| ELEMENT NAME | Hours X Rate |
| INDIRECT ONLY FLAG | N |
| MULTIPLE ENTRIES ALLOWED FLAG | {RULE:Multiple Entries DEFAULT:Y} |
| STARTING TIME DEF | {RULE: Hire Process DEFAULT:On Hire Date} |
| ENDING TIME DEF | {RULE: Termination Process DEFAULT:On Final Close Date} |
| PROCESS IN RUN FLAG | Y |
| RELATIVE PROCESSING PRIORITY | 0 |
| PROCESSING TYPE | {RULE:Recurring Or NonRecurring VALUE:N} |
| STANDARD LINK FLAG | {RULE:Availability Rule DEFAULT:N} |
| INPUT CURRENCY CODE | {RULE:Specify Currency DEFAULT:<Currency code for the given country>} |
| OUTPUT CURRENCY CODE | {RULE:Output Currency DEFAULT:<Currency of the given country>} |
| ONCE EACH PERIOD FLAG | {RULE:Once Per Period DEFAULT:N} |
| USE AT REL LEVEL | {RULE: Process Rel Level DEFAULT:N} |
| USE AT TERM LEVEL | {RULE: Process Term Level DEFAULT:N} |
| USE AT ASG LEVEL | {RULE: Process Asg Level DEFAULT:Y} |
| PRORATION FORMULA | _HOURS_X_RATE_PRORATION |
| PRORATION GROUP | {RULE:Proration DEFAULT:N} |
| TIME DEFINITION TYPE | ? |
| TIME DEFINITION | ? |
| RECALC EVENT GROUP | {RULE:Retro DEFAULT:N} |
| REPORTING NAME | |
| ITERATIVE FLAG | {RULE:Iterative Information DEFAULT:N} |
| ITERATIVE FORMULA | DEFAULT_GROSSUP |
| ITERATIVE PRIORITY | 10 |
| PROCESS MODE | {RULE:Process Period DEFAULT:S} |

| Element Type Usages | | | | |
|---|---|---|---|---|
| ELEMENT TYPE INCLUSION FLAG | Hours X Rate N | Hours X Rate N | Hours X Rate N | Hours X Rate N |
| RUN TYPE NAME | Separate Payment | Process Separately | Separate Payment - Non Periodic | Process Separately - Non Periodic |
| EXCLUSION RULE | {RULE: Recurring Or Non Recurring VALUE:R} | {RULE: Recurring Or Non Recurring VALUE:R} | {RULE: Recurring Or Non Recurring VALUE:N} | {RULE: Recurring Or Non-Recurring VALUE:N} |

| Fast Formulas | |
|---|---|
| FORMULA NAME | _HOURS_X_RATE |
| DESCRIPTION | Formula for Hours X Rate Template |
| FORMULA TEXT | /**********************************************<br>*************************<br>FORMULA NAME:   HOURS_X_RATE<br>FORMULA TYPE:   Payroll<br>DESCRIPTION:   Creates formula for template element where Hours must<br>             be input, Multiple defaults to 1 if not input, and Rate<br>             is determined by one of the following, in order of preference:<br>             1) Entry of "Rate" input value<br>             2) Entry of "Rate Code" input value<br>             3) Salary Admin "Pay Basis" information<br>--<br>INPUTS:   Hours<br>          Multiple<br>          Rate<br>          Rate_Code<br>--<br>Change History<br>--<br>*********************************************<br>****************<br>Formula Results :<br>   earnings_amount   Direct Result for Earnings Pay Value.<br>   mesg   Message indicating that this earnings will be deleted for<br>        for this assignment.<br>   Followings are Indirect result for Hours by Rate element:<br>   ELEMENT_TYPE_ID_PASSED<br>   RATE_PASSED<br>   OURS_PASSED<br>   MULTIPLE_PASSED<br>*********************************************<br>****************/<br>/* ===== Alias Section Begin ====== */<br>ALIAS HR_WORK_SCHEDULE AS Work_Schedule<br>ALIAS HR_TIMECARD_REQUIRED AS Timecard_Required<br>/* ===== Alias Section End ====== */<br>/* ===== Defaults Section Begin ===== */<br>default for PAY_PROC_PERIOD_START_DATE is '0001/01/01 00:00:00' (DATE)<br>default for PAY_PROC_PERIOD_END_DATE is '0001/01/02 00:00:00' (DATE)<br>default for ASG_HOURLY_SALARY is 0<br>default for ASG_SALARY_BASIS_CODE is 'NOT ENTERED'<br>default for USER_ENTERED_TIME is 'N'<br>default for Timecard_Required is 'N'<br>default for <BASE NAME>_ASG_GRE_RUN is 0<br>default for <BASE NAME>_ASG_GRE_YTD is 0<br>default for <BASE NAME>_HOURS_ASG_GRE_RUN is 0<br>default for Work_Schedule is 'NOT ENTERED'<br>default for ASG_HOURS is 0<br>default for Hours is 0 |

| Fast Formulas |
|---|

```
                    default for Rate
                    is 0
                    default for Multiple
                    is 1
                    default for ASG_FREQ_CODE              is 'NOT
                    ENTERED'
                    default for NET_ASG_GRE_RUN         is 0
                    default for NON_PAYROLL_PAYMENTS_ASG_GRE_RUN is 0
                    /* ===== Defaults Section End ===== */
                    /* ===== Inputs Section Begin ===== */
                    Inputs are           Hours,
                                         Rate,
                                         Rate_Code (text),
                                   Rate_Table (text),
                                         Rate_Table_Column (text),
                                         Multiple,
                                         Multiple_Code (text),
                                         Multiple_Table (text),
                                         Multiple_Table_Column (text)
/* ===== Inputs Section End ===== */
ELEMENT_TYPE_ID_PASSED = CURRENT_ELEMENT_TYPE_ID
RATE_PASSED = 0
HOURS_PASSED = 0
MULTIPLE_PASSED = 0
/* ===== CALCULATION SECTION BEGIN ===== */
    IF Rate WAS DEFAULTED THEN
        IF ASG_HOURLY_SALARY WAS DEFAULTED THEN
            (
                mesg =
GET_MESG('PAY','PAY_74096_RATE_NOT_FOUND','BASE_NAME',
'<BASE NAME>')
            RETURN mesg
            )
        ELSE
                /* Use pay basis input value id and basis
to find rate. If
                ASG_HOURLY_SALARY is the amount, then
can call
                Convert_Period_Type */
            IF ASG_SALARY_BASIS_CODE = 'HOURLY' THEN
                calc_rate = ASG_HOURLY_SALARY
            ELSE
                calc_rate = Convert_Period_Type(
Work_Schedule,
ASG_HOURS,
ASG_HOURLY_SALARY,
ASG_SALARY_BASIS_CODE,
'HOURLY',
PAY_PROC_PERIOD_START_DATE,
PAY_PROC_PERIOD_END_DATE,
ASG_FREQ_CODE)
        ELSE
                    /* Rate is entered */
                    calc_rate = Rate
/* ---- Now find Multiple ----- */
    IF Multiple WAS DEFAULTED THEN
        IF Multiple_Code WAS DEFAULTED THEN
                calc_Multiple = 1
        ELSE
                calc_Multiple = Multiple
/* ---- Now find Hours ----- */
    IF Hours WAS DEFAULTED THEN
        IF ASG_HOURS WAS DEFAULTED THEN
            (
                mesg =
GET_MESG('PAY','PAY_74097_HOURS_NOT_FOUND','BASE_NAME',
'<BASE NAME>')
            RETURN mesg
            )
        ELSE
                /* Use standard hours entered on
ASGignment */
            ( calc_hours = ASG_HOURS
                earnings_amount = (ASG_HOURS *
calc_Multiple * calc_rate)
            )
    ELSE
```

-continued

| Fast Formulas |
|---|
| /* Use entered hours. */<br>(<br>    earnings_amount = (Hours * calc_Multiple * calc_rate)<br>    calc_hours = Hours<br>)<br>/* ===== CALCULATION SECTION END ===== */<br>/* ===== Returns Section Begin ===== */<br>earnings_hours = calc_hours<br>RATE_PASSED = calc_rate<br>MULTIPLE_PASSED = Multiple<br>HOURS_PASSED = earnings_hours<br>        RETURN    earnings_amount<br>                      , earnings_hours<br>                      , mesg<br>                      , mesg_err<br>                      , ELEMENT_TYPE_ID_PASSED<br>                      , RATE_PASSED<br>                      , HOURS_PASSED<br>                      , MULTIPLE_PASSED<br>/* ===== Returns Section End ===== */ |
| FORMULA NAME _HOURS_X_RATE_PRORATION<br>DESCRIPTION Formula for Hours X Rate Proration Template |
| FORMULA TEXT /\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*<br>Description : Formula to calculate pro rated amounts.<br>DISCLAIMER : This formula is strictly for example or prototype<br>   purposes only. You should update the formula to meet your particular<br>   requirements. This formula may contain certain hard<br>   coded values to simplify the use of formulas for proration. A typical example<br>   of proration would be when a new employee starts work in the middle of a<br>   monthly payroll period and your payroll department makes a pro-rata payment<br>   to reflect the proportion of monthly pay to which the employee is entitled.<br>   The prototype formula supplied is only designed to work for payroll<br>   calculations involving proration and should not be used for any other purpose.<br>   Any use of the formula is subject to the terms of the Oracle license agreement<br>   for the HRMS programs and documentation.<br>\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*/<br>default for prorate_start is '01-JAN-1900' (date)<br>default for prorate_end is '01-JAN-1900' (date)<br>default for amount is 0.0<br>inputs are    prorate_start (date),<br>              prorate_end (date),<br>              annual_amount (number)<br>/\*\*<br>   Prorate_start and prorate_end dates are passed from the payroll engine. These<br>   dates basically represent the dates on which the changes occur in the<br>   deduction amount during the pay period.<br>annual_amount is an input value<br>   created in the element to which this formula will be tied. Here the<br>   assumption is that the user enters the annual deduction amount in the<br>   input value.<br>\*\*/<br>l_amount = annual_amount<br>message = 'Proration Start Date ' ||<br>TO_CHAR(prorate_start, 'DD-MON-YYYY')<br>IF (prorate_start was defaulted) then<br>( |

-continued

| Fast Formulas |
|---|
| /<br>   prorate_start date is defaulted when no pro ration occurs. Therefore we<br>   should just return the annual deduction amount divided by 12.<br>/<br>     l_amount = l_amount / 12<br>     return l_amount, message<br>)<br>else<br>(<br>    l_days = days_between(prorate_end , prorate_start) + 1<br>/<br>   l_days stores the number of days between prorate start and prorate<br>   end dates<br>/<br>    l_days_in_fiscal_year = 365<br>/<br>   It is another assumption that a year contains 365 days. Please change<br>   this assumption to take care of leap year. This formula will not work<br>   properly in a leap year.<br>/<br>    l_amount = (l_amount * l_days) / l_days_in_fiscal_year<br>/<br>   In the above calculation, since l_amount contains the annual deduction amount,<br>   it is divided by 365 days of the year to get the deduction amount per day.<br>   This amount is then multiplied by the number of days in question to get<br>   the proper deduction amount<br>/<br>return l_amount, message<br>) |

| Formula Rules | | |
|---|---|---|
| SHADOW ELEMENT TYPE | Hours X Rate | Hours X Rate |
| FORMULA | _HOURS_X_RATE | _HOURS_X_RATE |
| ELEMENT TYPE | Hours X Rate | Hours X Rate |
| EXCLUSION RULE | | |
| RESULT NAME | earnings_amount | earnings_hours |
| INPUT VALUE | Pay Value | Hours |
| RESULT RULE TYPE | D | D |

| Balance Types | | |
|---|---|---|
| EXCLUSION RULE | | |
| ASSIGNMENT | N | N |
| REMUNERATION FLAG | | |

| Balance Types | | |
|---|---|---|
| BALANCE NAME | Hours X Rate | Hours X Rate Hours |
| BALANCE UOM | M | H_DECIMAL2 |
| CURRENCY CODE | {RULE: Output Currency DEFAULT:< Currency of the given country>} | {RULE: Output Currency DEFAULT:< Currency of the given country>} |
| COMMENTS | Primary balance for Hours X Rate Earnings. | Hours balance for Hours X Rate Earnings. |
| REPORTING NAME | | Hours |
| CATEGORY NAME | Hourly Earnings | Earnings Hours |
| BASE BALANCE TYPE | | Hours X Rate |
| INPUT VALUE | Pay Value | |

| Input Values | | | | | |
|---|---|---|---|---|---|
| ELEMENT TYPE | Hours X Rate | Hours X Rate | Hours X Rate | Hours X Rate | Hours X Rate |
| EXCLUSION RULE | | | | | |
| EXCLUSION RULE VALUE | | | | | |
| DISPLAY SEQUENCE | 1 | 2 | 3 | 4 | 7 |

| Input Values | | | | | |
|---|---|---|---|---|---|
| GENERATE DB ITEMS FLAG | Y | Y | Y | Y | Y |
| HOT DEFAULT FLAG | N | N | N | N | N |
| MANDATORY FLAG | X | N | N | N | X |
| NAME | Pay Value | Hours | Rate | Multiple | Jurisdiction |
| UOM | M | H_DECIMAL2 | N | N | C |
| LOOKUP TYPE | | | | | |
| DEFAULT VALUE | | | | | |
| DEFAULT VALUE COLUMN | | | | | |

| Balance Feeds | | |
|---|---|---|
| INPUT VALUE | Pay Value | Hours |
| BALANCE TYPE | Hours X Rate | Hours X Rate Hours |
| EXCLUSION RULE | | |
| SCALE | 1 | 1 |
| BALANCE NAME | | |

| Defined Balances | | |
|---|---|---|
| BALANCE TYPE | DIMENSION | EXCLUSION RULE |
| Hours X Rate | _CORE_PRS_RUN | |
| Hours X Rate | _CORE_PRS_PY_PTD | |
| Hours X Rate | _CORE_PRS_MTD | |
| Hours X Rate | _CORE_PRS_QTD | |
| Hours X Rate | _CORE_PRS_YTD | |
| Hours X Rate | _CORE_PRS_TU_RUN | |
| Hours X Rate | _CORE_PRS_TU_PY_PTD | |
| Hours X Rate | _CORE_PRS_TU_YTD | |
| Hours X Rate | _CORE_ASG_RUN | |
| Hours X Rate | _CORE_ASG_PY_PTD | |
| Hours X Rate | _CORE_ASG_MTD | |
| Hours X Rate | _CORE_ASG_QTD | |
| Hours X Rate | _CORE_ASG_YTD | |
| Hours X Rate | _CORE_ASG_TU_RUN | |
| Hours X Rate | _CORE_ASG_TU_PY_PTD | |
| Hours X Rate | _CORE_ASG_TU_YTD | |
| Hours X Rate Hours | _CORE_PRS_RUN | |
| Hours X Rate Hours | _CORE_PRS_PY_PTD | |
| Hours X Rate Hours | _CORE_PRS_MTD | |
| Hours X Rate Hours | _CORE_PRS_QTD | |
| Hours X Rate Hours | _CORE_PRS_YTD | |

| Defined Balances | | |
|---|---|---|
| BALANCE TYPE | DIMENSION | EXCLUSION RULE |
| Hours X Rate Hours | _CORE_PRS_TU_RUN | |
| Hours X Rate Hours | _CORE_PRS_TU_PY_PTD | |
| Hours X Rate Hours | _CORE_PRS_TU_YTD | |
| Hours X Rate Hours | _CORE_ASG_RUN | |
| Hours X Rate Hours | _CORE_ASG_PY_PTD | |
| Hours X Rate Hours | _CORE_ASG_MTD | |
| Hours X Rate Hours | _CORE_ASG_QTD | |
| Hours X Rate Hours | _CORE_ASG_YTD | |
| Hours X Rate Hours | _CORE_ASG_TU_RUN | |
| Hours X Rate Hours | _CORE_ASG_TU_PY_PTD | |
| Hours X Rate Hours | _CORE_ASG_TU_YTD | |

| Retro Component Usages | |
|---|---|
| CREATOR TYPE | ET |
| CREATOR | Days X Rate |
| RETRO COMPONENT | Replacement |
| DEFAULT COMPONENT | Y |
| REPROCESS TYPE | R |

Example Percentage of Earnings Predefined Template:

| Element Types | |
|---|---|
| CLASSIFICATION NAME | {Chosen classification} |
| ADDITIONAL ENTRY ALLOWED FLAG | {RULE:Over Ride DEFAULT:N} |
| ADJUSTMENT ONLY FLAG | N |
| CLOSED FOR ENTRY FLAG | N |

| Element Types | |
|---|---|
| ELEMENT NAME | Percentage of Earnings |
| INDIRECT ONLY FLAG | N |
| MULTIPLE ENTRIES ALLOWED FLAG | {RULE:Multiple Entries DEFAULT:Y} |
| STARTING TIME DEF | {RULE: Hire Process DEFAULT:On Hire Date} |
| ENDING TIME DEF | {RULE: Termination Process DEFAULT:On Final Close Date} |
| PROCESS IN RUN FLAG | Y |
| RELATIVE PROCESSING PRIORITY | 0 |
| PROCESSING TYPE | {RULE:Recurring Or NonRecurring VALUE:N} |
| STANDARD LINK FLAG | {RULE:Availability Rule DEFAULT:N} |
| INPUT CURRENCY CODE | {RULE:Specify Currency DEFAULT:<Currency code for the given country>} |
| OUTPUT CURRENCY CODE | {RULE:Output Currency DEFAULT:<Currency of the given country>} |
| ONCE EACH PERIOD FLAG | {RULE:Once Per Period DEFAULT:N} |
| USE AT REL LEVEL | {RULE: Process Rel Level DEFAULT:N} |
| USE AT TERM LEVEL | {RULE: Process Term Level DEFAULT:N} |
| USE AT ASG LEVEL | {RULE: Process Asg Level DEFAULT:Y} |
| PRORATION FORMULA | _PERCENTAGE_OF_EARNINGS_PRORATION |
| PRORATION GROUP | {RULE:Proration DEFAULT:N} |
| TIME DEFINITION TYPE | ? |
| TIME DEFINITION | ? |
| RECALC EVENT GROUP | {RULE:Retro DEFAULT:N} |
| REPORTING NAME | |
| ITERATIVE FLAG | {RULE:Iterative Information DEFAULT:N} |
| ITERATIVE FORMULA | DEFAULT_GROSSUP |
| ITERATIVE PRIORITY | 10 |
| PROCESS MODE | {RULE:Process Period DEFAULT:S} |

| Element Type Usages | | | | |
|---|---|---|---|---|
| ELEMENT TYPE | Percentage of Earnings | Percentage of Earnings | Percentage of Earnings | Percentage of Earnings |
| INCLUSION FLAG | N | N | N | N |
| RUN TYPE NAME | Separate Payment | Process Separately | Separate Payment - Non Periodic | Process Separately - Non Periodic |
| EXCLUSION RULE | {RULE: Recurring Or NonRecurring VALUE:R} | {RULE: Recurring Or NonRecurring VALUE:R} | {RULE: Recurring Or NonRecurring VALUE:N} | {RULE: Recurring Or NonRecurring VALUE:N} |

| Fast Formulas | |
|---|---|
| FORMULA NAME | _PCT_EARN |
| DESCRIPTION | Formula for Percentage of Earnings Template |
| FORMULA TEXT | /********************************************** ***************************<br>FORMULA NAME: '_PCT_EARN' |

| Fast Formulas |
|---|

```
FORMULA TYPE: Payroll
DESCRIPTION:
           This formula applies a percentage to
the appropriate
           regular earnings of an employee
according to the following
           rules in descending priority ::
    1) Salary Admin Pay Basis:
REGULAR_SALARY * Percentage
           if Pay Basis not hourly; else
             ASG_SALARY * Percentage * normal
period hours
*****************************************************
*******************
FORMULA TEXT
Formula Results :
 template_earning    Direct Result for Earnings
Amount (ie. Pay Value).
 mesg      Message indicating that this earnings
will be deleted for
        for this assignment.
*****************************************************
********************/
/* ===== Defaults Section Begin ===== */
default for         ASG_SALARY
is 0
default for         ASG_SALARY_BASIS_CODE
is 'NOT ENTERED'
default for         GROSS_PAY_ASG_GRE_RUN
is 0
Default for         <BASE NAME>_ASG_GRE_RUN
is 0
Default for         <BASE NAME>_ASG_GRE_YTD
is 0
default for         HR_WORK_SCHEDULE
is 'NOT ENTERED'
default for         ASG_HOURS
is 0
default for         Percentage
is 0
default for         PAY_PROC_PERIOD_START_DATE is
'0001/01/01 00:00:00' (DATE)
default for         PAY_PROC_PERIOD_END_DATE    is
'0001/01/02 00:00:00' (DATE)
default for         ASG_FREQ_CODE                       is
'NOT ENTERED'
/* ===== Defaults Section End ===== */
/* ===== Inputs Section Begin ===== */
Inputs are          Percentage
/* ===== Inputs Section End ===== */
/* ===== Updatable Values Section ===== */
RATE_TABLE                                 = /**/ 'WAGE
RATES' /**/
RATE_TABLE_COLUMN        = /**/ 'Wage Rate' /**/
/* ===== Updatable Values Section ===== */
/* ===== CALCULATION SECTION BEGIN ===== */
    IF ASG_SALARY_BASIS_CODE = 'HOURLY' THEN
      ( regular_rate = ASG_SALARY
        period_hours =
Convert_Period_Type(SCL_ASG_MX_WORK_SCHEDULE,
ASG_HOURS,
ASG_HOURS,
ASG_FREQ_CODE,
'PERIOD',
PAY_PROC_PERIOD_START_DATE,
PAY_PROC_PERIOD_END_DATE,
ASG_FREQ_CODE)
        earnings_amount = ROUNDUP(
                (Percentage * regular_rate *
period_hours / 100) ,2)
       )
    ELSE
       earnings_amount = ROUNDUP(
                      (Percentage * <BASE
NAME>_ASG_GRE_RUN / 100 ),2)
/* ===== CALCULATION SECTION END ===== */
/* ===== Returns Section Begin ===== */
```

| | Fast Formulas |
|---|---|
| | RETURN earnings_amount,<br>       mesg,<br>       mesg_err<br>/* ===== Returns Section End ===== */<br>/* End Program */ |
| FORMULA<br>NAME<br>DESCRIPTION | _PERCENTAGE_OF_EARNINGS_PRORATION<br>Formula for Percentage of Earnings Proration Template |
| FORMULA<br>TEXT | /*****************************************<br>*******<br>Description : Formula to calculate pro rated amounts.<br>DISCLAIMER : This formula is strictly for example or prototype<br>  purposes only. You should update the formula to meet your particular<br>  requirements. This formula may contain certain hard<br>  coded values to simplify the use of formulas for proration. A typical example<br>  of proration would be when a new employee starts work in the middle of a<br>  monthly payroll period and your payroll department makes a pro-rata payment<br>  to reflect the proportion of monthly pay to which the employee is entitled.<br>  The prototype formula supplied is only designed to work for payroll<br>  calculations involving proration and should not be used for any other purpose.<br>  Any use of the formula is subject to the terms of the Oracle license agreement<br>  for the HRMS programs and documentation.<br>***************************************<br>*******/<br>default for    prorate_start is '01-JAN-1900' (date)<br>default for    prorate_end is '01-JAN-1900' (date)<br>default for    amount is 0.0<br>inputs are    prorate_start (date),<br>        prorate_end (date),<br>        annual_amount (number)<br>/<br>  Prorate_start and prorate_end dates are passed from the payroll engine. These<br>  dates basically represent the dates on which the changes occur in the<br>  deduction amount during the pay period.<br>annual_amount is an input value<br>  created in the element to which this formula will be tied. Here the<br>  assumption is that the user enters the annual deduction amount in the<br>  input value.<br>/<br>l_amount = annual_amount<br>message = 'Proration Start Date ' \|\|<br>TO_CHAR(prorate_start, 'DD-MON-YYYY')<br>IF (prorate_start was defaulted) then<br>(<br>/<br>  prorate_start date is defaulted when no pro ration occurs. Therefore we<br>  should just return the annual deduction amount divided by 12.<br>/<br>    l_amount = l_amount / 12<br>    return l_amount, message<br>)<br>else<br>(<br>    l_days = days_between(prorate_end , prorate_start) + 1<br>/<br>  l_days stores the number of days between prorate start and prorate |

| Fast Formulas |
| --- |
| end dates<br>\*\*/<br>    l_days_in_fiscal_year = 365<br>/\*\*<br>    It is another assumption that a year contains 365 days. Please change<br>        this assumption to take care of leap year. This formula will not work<br>        properly in a leap year.<br>\*\*/<br>    l_amount = (l_amount \* l_days) / l_days_in_fiscal_year<br>/\*\*<br>    In the above calculation, since l_amount contains the annual deduction amount,<br>      it is divided by 365 days of the year to get the deduction amount per day.<br>      This amount is then multiplied by the number of days in question to get<br>      the proper deduction amount<br>\*\*/<br>return l_amount, message<br>) |

| Formula Rules | |
| --- | --- |
| SHADOW ELEMENT TYPE | Percentage of Earnings |
| FORMULA | _PCT_EARN |
| ELEMENT TYPE | Percentage of Earnings |
| EXCLUSION RULE | |
| RESULT NAME | earnings_amount |
| INPUT VALUE | Pay Value |
| RESULT RULE TYPE | D |

| Balance Types | |
| --- | --- |
| EXCLUSION RULE | |
| ASSIGNMENT REMUNERATION FLAG | N |
| BALANCE NAME | Percentage of Earnings |
| BALANCE UOM | M |
| CURRENCY CODE | {RULE:Output Currency DEFAULT:<Currency of the given country>} |
| COMMENTS | Primary balance for Percentage of Earnings. |
| REPORTING NAME | |
| CATEGORY NAME | Earnings |
| BASE BALANCE TYPE | |
| INPUT VALUE | Pay Value |

| Input Values | | | |
| --- | --- | --- | --- |
| ELEMENT TYPE | Percentage of Earnings | Percentage of Earnings | Percentage of Earnings |
| EXCLUSION RULE | | | |
| DISPLAY SEQUENCE | 1 | 2 | 5 |
| GENERATE DB ITEMS FLAG | Y | Y | Y |
| HOT DEFAULT FLAG | N | N | N |
| MANDATORY FLAG | X | N | X |
| NAME | Pay Value | Percentage | Jurisdiction |
| UOM | M | M | C |
| LOOKUP TYPE | | | |
| DEFAULT VALUE | | | |
| DEFAULT VALUE COLUMN | | | |

| Balance Feeds | |
| --- | --- |
| INPUT VALUE | Pay Value |
| BALANCE TYPE | Percentage of Earnings |
| EXCLUSION RULE | |
| SCALE | 1 |
| BALANCE NAME | |

| Defined Balances | | |
| --- | --- | --- |
| BALANCE TYPE | DIMENSION | EXCLUSION RULE |
| Percentage of Earnings | _CORE_PRS_RUN | |
| Percentage of Earnings | _CORE_PRS_PY_PTD | |
| Percentage of Earnings | _CORE_PRS_MTD | |
| Percentage of Earnings | _CORE_PRS_QTD | |
| Percentage of Earnings | _CORE_PRS_YTD | |
| Percentage of Earnings | _CORE_PRS_TU_RUN | |
| Percentage of Earnings | _CORE_PRS_TU_PY_PTD | |

Defined Balances

| BALANCE TYPE | DIMENSION | EXCLUSION RULE |
|---|---|---|
| Percentage of Earnings | _CORE_PRS_TU_YTD | |
| Percentage of Earnings | _CORE_ASG_RUN | |
| Percentage of Earnings | _CORE_ASG_PY_PTD | |
| Percentage of Earnings | _CORE_ASG_MTD | |
| Percentage of Earnings | _CORE_ASG_QTD | |
| Percentage of Earnings | _CORE_ASG_YTD | |
| Percentage of Earnings | _CORE_ASG_TU_RUN | |
| Percentage of Earnings | _CORE_ASG_TU_PY_PTD | |
| Percentage of Earnings | _CORE_ASG_TU_YTD | |

Retro Component Usages

| | |
|---|---|
| CREATOR TYPE | ET |
| CREATOR | Percentage of Earnings |
| RETRO COMPONENT | Replacement |
| DEFAULT COMPONENT | Y |
| REPROCESS TYPE | R |

Example Flat Amount Deduction Element Predefined Template:

Element Types

| | |
|---|---|
| CLASSIFICATION NAME | {Chosen classification} |
| ADDITIONAL ENTRY: ALLOWED FLAG | {RULE:Over Ride DEFAULT:N} |
| ADJUSTMENT ONLY FLAG | N |
| CLOSED FOR ENTRY FLAG | N |
| ELEMENT NAME | Flat Amount Deduction |
| INDIRECT ONLY FLAG | N |
| MULTIPLE ENTRIES ALLOWED FLAG | {RULE:Multiple Entries DEFAULT:N} |
| STARTING TIME DEF | {RULE: Hire Process DEFAULT:On Hire Date} |
| ENDING TIME DEF | {RULE: Termination Process DEFAULT:On Final Close Date} |
| PROCESS IN RUN FLAG | Y |
| RELATIVE PROCESSING PRIORITY | 0 |
| PROCESSING TYPE | {RULE:Recurring Or NonRecurring VALUE:N} |
| STANDARD LINK FLAG | {RULE:Availability Rule DEFAULT:N} |
| INPUT CURRENCY CODE | {RULE:Specify Currency DEFAULT:<Currency code for the given country>} |
| OUTPUT CURRENCY CODE | {RULE:Output Currency DEFAULT:<Currency of the given country>} |
| ONCE EACH PERIOD FLAG | {RULE:Once Per Period DEFAULT:N} |
| USE AT REL LEVEL | {RULE: Process Rel Level DEFAULT:N} |
| USE AT TERM LEVEL | {RULE: Process Term Level DEFAULT:N} |
| USE AT ASG LEVEL | {RULE: Process Asg Level DEFAULT:Y} |
| PRORATION FORMULA | _FLAT_AMOUNT_DEDUCTION_PRORATION |
| PRORATION GROUP | {RULE:Proration DEFAULT:N} |
| TIME DEFINITION TYPE | ? |
| TIME DEFINITION | ? |
| RECALC EVENT GROUP | {RULE:Retro DEFAULT:N} |
| REPORTING NAME | |
| ITERATIVE FLAG | {RULE:Iterative Information DEFAULT:N} |
| ITERATIVE FORMULA | DEFAULT_GROSSUP |
| ITERATIVE PRIORITY | 10 |
| PROCESS MODE | |

Element Types

| | |
|---|---|
| CLASSIFICATION NAME | {Chosen classification} |

| | |
|---|---|
| ADDITIONAL ENTRY ALLOWED FLAG | {RULE:Over Ride DEFAULT:N} |
| ADJUSTMENT ONLY FLAG | N |
| CLOSED FOR ENTRY FLAG | N |
| ELEMENT NAME | Flat Amount Deduction Special Feature |
| INDIRECT ONLY FLAG | N |
| MULTIPLE ENTRIES ALLOWED FLAG | {RULE:Multiple Entries DEFAULT:N} |
| STARTING TIME DEF | {RULE: Hire Process DEFAULT:On Hire Date} |
| ENDING TIME DEF | {RULE: Termination Process DEFAULT:On Final Close Date} |
| PROCESS IN RUN FLAG | Y |
| RELATIVE PROCESSING PRIORITY | 50 |
| PROCESSING TYPE | {RULE:Recurring Or NonRecurring VALUE:N} |
| STANDARD LINK FLAG | {RULE:Availability Rule DEFAULT:N} |
| INPUT CURRENCY CODE | {RULE:Specify Currency DEFAULT:<Currency code for the given country>} |
| OUTPUT CURRENCY CODE | {RULE:Output Currency DEFAULT:<Currency of the given country>} |
| ONCE EACH PERIOD FLAG | |
| USE AT REL LEVEL | |
| USE AT TERM LEVEL | |
| USE AT ASG LEVEL | |
| PRORATION FORMULA | ? |
| PRORATION GROUP | ? |
| TIME DEFINITION TYPE | ? |
| TIME DEFINITION | ? |
| RECALC EVENT GROUP | ? |
| REPORTING NAME | SF |
| ITERATIVE FLAG | ? |
| ITERATIVE FORMULA | ? |
| ITERATIVE PRIORITY PROCESS MODE | ? |

| Element Type Usages | | | | |
|---|---|---|---|---|
| ELEMENT TYPE | Flat Amount Deduction | Flat Amount Deduction | Flat Amount Deduction | Flat Amount Deduction |
| INCLUSION FLAG | N | N | N | N |

| Element Type Usages | | | | |
|---|---|---|---|---|
| RUN TYPE NAME | Separate Payment | Process Separately | Process Separately - Non Periodic | Separate Payment - Non Periodic |
| EXCLUSION RULE | {RULE: Recurring Or Non Recurring VALUE:R} | {RULE: Recurring Or Non-Recurring VALUE:R} | {RULE: Recurring Or Non-Recurring VALUE:N} | {RULE: Recurring Or Non-Recurring VALUE:N} |

| Fast Formulas | |
|---|---|
| FORMULA NAME | _FLAT_AMOUNT_DEDN |
| DESCRIPTION | Flat Amount formula for Deduction Template |
| FORMULA TEXT | /************************************************************** <br> FORMULA NAME: _FLAT_AMOUNT_DEDN <br> FORMULA TYPE: Payroll <br> DESCRIPTION: Formula for Flat Amount for Deduction Template. <br> Returns pay value (Amount); |

-continued

| Fast Formulas |
|---|

```
*******************************************************
*****************************
FORMULA TEXT
Formula Results :
  dedn_amt        Direct Result for Deduction
Amount
  not_taken       Update Deduction Recurring Entry
Not Taken
  to_arrears      Update Deduction Recurring Entry
Arrears Contr
  set_clear       Update Deduction Recurring Entry
Clear Arrears
  STOP_ENTRY      Stop current recurring entry
  to_total_owed   Update Deduction Recurring Entry
Accrued
  mesg            Message (Warning)
*******************************************************
*****************************/
/* Database Item Defaults */
default for INSUFFICIENT_FUNDS_TYPE           is
'NOT ENTERED'
/* ===== Database Item Defaults End ===== */
/* ===== Input Value Defaults Begin ===== */
default for Total_Owed                        is
0
default for Clear_Arrears (text)              is
'N'
default for Amount                            is
0
/* ===== Input Value Defaults End ===== */
DEFAULT FOR mesg                              is 'NOT
ENTERED'
/* ===== Inputs Section Begin ===== */
INPUTS ARE
      Amount
      ,Total_Owed
      ,Clear_Arrears (text)
/* ===== Inputs Section End ===== */
dedn_amt          = Amount
to_total_owed     = 0
to_arrears        = 0
to_not_taken      = 0
total_dedn        = 0
insuff_funds_type = INSUFFICIENT_FUNDS_TYPE
net_amount        = NET_PAY_ASG_GRE_RUN
/* ==== Entry ITD Check Begin ==== */
  IF (  <BASE_NAME>_ACCRUED_ENTRY_ITD = 0 AND
        <BASE_NAME>_ACCRUED_ASG_GRE_ITD < > 0 )
THEN
    (
    to_total_owed = -1 *
<BASE_NAME>_ACCRUED_ASG_GRE_ITD + dedn_amt
    )
  IF (  <BASE_NAME>_ARREARS_ENTRY_ITD = 0 AND
        <BASE_NAME>_ARREARS_ASG_GRE_ITD < > 0 )
THEN
    (
    to_arrears = -1 *
<BASE_NAME>_ARREARS_ASG_GRE_ITD
    )
/* ==== Entry ITD Check End ==== */
/* ===== Arrears Section Begin ===== */
  IF Clear_Arrears = 'Y' THEN
    (
    to_arrears = -1 *
<BASE_NAME>_ARREARS_ASG_GRE_ITD
      set_clear = 'No'
    )
  ELSE
    (
    IF <BASE_NAME>_ARREARS_ASG_GRE_ITD < > 0 THEN
      (
       to_arrears = -1 *
<BASE_NAME>_ARREARS_ASG_GRE_ITD
      )
    )
  IF ( net_amount – dedn_amt < 0 ) THEN
```

| Fast Formulas |
|---|

```
  (
    IF insuff_funds_type = 'ERRA' THEN
    (
      mesg =
GET_MESG('PAY','PAY_INSUFF_FUNDS_FOR_DED')
      RETURN mesg
    )
  )
  /* When there is no arrears */
  IF (  insuff_funds_type = 'PD' OR
        insuff_funds_type = 'NONE' ) THEN
  (
    IF ( net_amount − dedn_amt >= 0 ) THEN
    (
      to_arrears     = 0
      to_not_taken   = 0
      dedn_amt       = dedn_amt
    )
    ELSE
    (
      IF ( insuff_funds_type = 'PD' ) THEN
      (
        to_arrears     = 0
        to_not_taken   = dedn_amt − net_amount
        dedn_amt       = net_amount
      )
      ELSE
      (
        to_arrears     = 0
        to_not_taken   = dedn_amt
        dedn_amt       = 0
      )
    )
  )
  ELSE   /* When there is arrears */
  (
    IF ( net_amount   <= 0 ) THEN
    (
      to_arrears     = dedn_amt
      to_not_taken   = dedn_amt
      dedn_amt       = 0
    )
    ELSE
    (
      total_dedn = dedn_amt +
<BASE_NAME>_ARREARS_ASG_GRE_ITD
      IF ( net_amount >= total_dedn ) THEN
      (
        to_arrears     = −1 *
<BASE_NAME>_ARREARS_ASG_GRE_ITD
        to_not_taken   = 0
        dedn_amt       = total_dedn
      )
      ELSE
      (
        IF ( insuff_funds_type = 'APD' ) THEN
        (
          to_arrears     = total_dedn −
net_amount
          to_arrears     = to_arrears −
<BASE_NAME>_ARREARS_ASG_GRE_ITD
          IF ( net_amount >= dedn_amt ) THEN
          (
            to_not_taken = 0
          )
          ELSE
          (
            to_not_taken = to_arrears
          )
          dedn_amt       = net_amount
        )
        ELSE
        (
          IF ( net_amount >= dedn_amt ) THEN
          (
            to_arrears     = 0
            to_not_taken   = 0
```

| Fast Formulas |
|---|
| ```
                    dedn_amt      = dedn_amt
                )
                ELSE
                (
                    to_arrears    = dedn_amt
                    to_not_taken  = dedn_amt
                    dedn_amt      = 0
                )
            )
        )
    )
)
/* ===== Arrears Section End ===== */
/* ===== Stop Rule Section Begin *===== */
    to_total_owed = dedn_amt
    IF Total_Owed WAS NOT DEFAULTED THEN
    (
        total_accrued  = dedn_amt +
<BASE_NAME>_ACCRUED_ASG_GRE_ITD
        IF total_accrued  >= Total_Owed THEN
        (
            dedn_amt = Total_Owed −
<BASE_NAME>_ACCRUED_ASG_GRE_ITD
            /* The total has been reached - the
return will stop the entry under
            these conditions.   Also, zero out
Accrued balance.   */
to_total_owed = −1 *
<BASE_NAME>_ACCRUED_ASG_GRE_ITD
            STOP_ENTRY = 'Y'
            mesg =
GET_MESG('PAY','PAY_STOPPED_ENTRY',
'BASE_NAME','<BASE_NAME>')
        )
    )
/* ===== Stop Rule Section End ===== */
    RETURN dedn_amt,
            to_not_taken,
            to_arrears,
            to_total_owed,
            STOP_ENTRY,
            set_clear,
            mesg
    /* End Formula Text */
``` |

| FORMULA NAME | _FLAT_AMOUNT_DEDUCTION_PRORATION |
|---|---|
| DESCRIPTION | Formula for Flat Amount Deduction Proration Template |
| FORMULA TEXT | /************************************************<br>******<br>Description : Formula to calculate pro rated amounts.<br>DISCLAIMER : This formula is strictly for example or prototype<br> purposes only. You should update the formula to meet your particular<br> requirements. This formula may contain certain hard<br> coded values to simplify the use of formulas for proration. A typical example<br> of proration would be when a new employee starts work in the middle of a<br> monthly payroll period and your payroll department makes a pro-rata payment<br> to reflect the proportion of monthly pay to which the employee is entitled.<br> The prototype formula supplied is only designed to work for payroll<br> calculations involving proration and should not be used for any other purpose.<br> Any use of the formula is subject to the terms of the Oracle license agreement<br> for the HRMS programs and documentation.<br>***********************************************<br>********/<br>default for  prorate_start is '01-JAN-1900' (date) |

| Fast Formulas |
|---|
| default for prorate_end is '01-JAN-1900' (date)<br>default for amount is 0.0<br>inputs are prorate_start (date),<br>          prorate_end (date),<br>          annual_amount (number)<br>/<br>   Prorate_start and prorate_end dates are passed from the payroll engine. These<br>   dates basically represent the dates on which the changes occur in the<br>   deduction amount during the pay period.<br>annual_amount is an input value<br>   created in the element to which this formula will be tied. Here the<br>   assumption is that the user enters the annual deduction amount in the<br>   input value.<br>/<br>l_amount = annual_amount<br>message = 'Proration Start Date ' || TO_CHAR(prorate_start, 'DD-MON-YYYY')<br>IF (prorate_start was defaulted) then<br>(<br>/<br>   prorate_start date is defaulted when no pro ration occurs. Therefore we<br>   should just return the annual deduction amount divided by 12.<br>/<br>    l_amount = l_amount / 12<br>    return l_amount, message<br>)<br>else<br>(<br>    l_days = days_between(prorate_end , prorate_start) + 1<br>/<br>   l_days stores the number of days between prorate start and prorate<br>   end dates<br>/<br>    l_days_in_fiscal_year = 365<br>/<br>   It is another assumption that a year contains 365 days. Please change<br>   this assumption to take care of leap year. This formula will not work<br>   properly in a leap year.<br>/<br>    l_amount = (l_amount * l_days) / l_days_in_fiscal_year<br>/<br>   In the above calculation, since l_amount contains the annual deduction amount,<br>   it is divided by 365 days of the year to get the deduction amount per day.<br>   This amount is then multiplied by the number of days in question to get<br>   the proper deduction amount<br>/<br>return l_amount, message<br>) |

| Formula Rules | | | |
|---|---|---|---|
| SHADOW ELEMENT TYPE | Flat Amount Deduction | Flat Amount Deduction | Flat Amount Deduction |
| FORMULA | _FLAT_AMOUNT_DEDN | _FLAT_AMOUNT_DEDN | _FLAT_AMOUNT_DEDN |
| ELEMENT TYPE | Flat Amount Deduction | Flat Amount Deduction Special Feature | Flat Amount Deduction Special Feature |

| | | | | |
|---|---|---|---|---|
| EXCLUSION RULE | | {RULE:Earning Threshold VALUE:ERRA}, {RULE:Earning Threshold VALUE:NONE}, {RULE:Earning Threshold VALUE:PD} | {RULE:Total Reached VALUE:N} | |
| RESULT NAME | dedn_amt | to_arrears | to_total_owed | |
| INPUT VALUE | Pay Value | Arrears Contr | Accrued | |
| RESULT RULE TYPE | D | I | I | |

| Formula Rules | | | | |
|---|---|---|---|---|
| SHADOW ELEMENT TYPE | Flat Amount Deduction | Flat Amount Deduction | Flat Amount Deduction | |
| FORMULA | _FLAT_AMOUNT_DEDN | _FLAT_AMOUNT_DEDN | _FLAT_AMOUNT_DEDN | |
| ELEMENT TYPE | Flat Amount Deduction | Flat Amount Deduction | Flat Amount Deduction Special Feature | |
| EXCLUSION RULE | {RULE:Total Reached VALUE:N} | {RULE:Earning Threshold VALUE:ERRA}, {RULE:Earning Threshold VALUE:NONE}, {RULE:Earning Threshold VALUE:PD} | | |
| RESULT NAME | STOP_ENTRY | set_clear | to_not_taken | |
| INPUT VALUE | | Clear Arrears | Not Taken | |
| RESULT RULE TYPE | S | U | I | |

| Balance Types | | | | |
|---|---|---|---|---|
| EXCLUSION RULE | | | | |
| ASSIGNMENT REMUNERATION FLAG | N | N | N | N |
| BALANCE NAME | Flat Amount Deduction | Flat Amount Deduction Accrued | Flat Amount Deduction Arrears | Flat Amount Deduction Not Taken |
| BALANCE UOM | M | M | M | M |
| CURRENCY CODE | {RULE: Output Currency DEFAULT:<Currency of the given country>} | {RULE: Output Currency DEFAULT:<Currency of the given country>} | {RULE: Output Currency DEFAULT:<Currency of the given country>} | {RULE:Output Currency DEFAULT:<Currency of the given country>} |
| COMMENTS | Primary balance for Flat Amount Deductions. | Accrued balance for Flat Amount Deductions. | Arrears balance for Flat Amount Deductions. | Not Taken balance for Flat Amount Deductions. |
| REPORTING NAME | | Accrued | Arrears | Not Taken |
| CATEGORY NAME | Deductions | Wages | Wages | Wages |
| BASE BALANCE TYPE | | Flat Amount Deduction | Flat Amount Deduction | Flat Amount Deduction |
| INPUT VALUE | Pay Value | | | |

| Input Values | | | | | |
|---|---|---|---|---|---|
| ELEMENT TYPE | Flat Amount Deduction | Flat Amount Deduction | Flat Amount Deduction | Flat Amount Deduction | Flat Amount Deduction Special Features |

-continued

|  |  |  |  |  |  |
|---|---|---|---|---|---|
| EXCLUSION RULE |  | {RULE:Earning Threshold VALUE:ERRA}, {RULE:Earning Threshold VALUE:NONE}, {RULE:Earning Threshold VALUE:PD} | {RULE: Total Reached VALUE:N} |  |  |
| EXCLUSION RULE VALUE |  |  |  |  |  |
| DISPLAY SEQUENCE | 1 | 2 | 3 | 4 | 1 |
| GENERATE DB ITEMS FLAG | Y | Y | Y | Y | Y |
| HOT DEFAULT FLAG | N | N | N | N | N |
| MANDATORY FLAG | X | N | N | N | X |
| NAME | Pay Value | Amount | Clear Arrears | Total Owed | Pay Value |
| UOM | M | M | C | M | M |
| LOOKUP TYPE |  |  | YES_NO |  |  |
| DEFAULT VALUE |  |  | N |  |  |
| DEFAULT VALUE COLUMN |  |  |  |  |  |

| Input Values | | | |
|---|---|---|---|
| ELEMENT TYPE | Flat Amount Deduction Special Features | Flat Amount Deduction Special Features | Flat Amount Deduction Special Features |
| EXCLUSION RULE | {RULE: Total Reached VALUE:N} |  | {RULE:Earning Threshold VALUE:ERRA}, {RULE:Earning Threshold VALUE:NONE}, {RULE:Earning Threshold VALUE:PD} |
| DISPLAY SEQUENCE | 2 | 3 | 4 |
| GENERATE DB ITEMS FLAG | Y | Y | Y |
| HOT DEFAULT FLAG | N | N | N |
| MANDATORY FLAG | X | X | X |
| NAME | Accrued | Not Taken | Arrears Contr |
| UOM | M | M | M |
| LOOKUP TYPE |  |  |  |
| DEFAULT VALUE |  |  |  |
| DEFAULT VALUE COLUMN |  |  |  |

| Balance Feeds | | | | |
|---|---|---|---|---|
| INPUT VALUE | Pay Value | Arrears Contr | Not Taken | Accrued |
| BALANCE TYPE | Flat Amount Deduction | Flat Amount Deduction Arrears | Flat Amount Deduction Not Taken | Flat Amount Deduction Accrued |
| EXCLUSION RULE |  | {RULE:Earning Threshold VALUE:ERRA}, {RULE:Earning Threshold VALUE:NONE}, | {RULE:Earning Threshold VALUE:ERRA}, {RULE:Earning Threshold VALUE:NONE}, |  |

-continued

| Balance Feeds | | | | |
|---|---|---|---|---|
|  |  |  | {RULE:Earning Threshold VALUE:PD} | {RULE:Earning Threshold VALUE:PD} |
| SCALE |  | 1 | 1 | 1 | 1 |
| BALANCE NAME | Pay Value | Arrears Contr | Not Taken | Accrued |

| Defined Balances | | |
|---|---|---|
| BALANCE TYPE | DIMENSION | EXCLUSION RULE |
| Flat Amount Deduction | _CORE_PRS_RUN | |
| Flat Amount Deduction | _CORE_PRS_PY_PTD | |
| Flat Amount Deduction | _CORE_PRS_MTD | |
| Flat Amount Deduction | _CORE_PRS_QTD | |
| Flat Amount Deduction | _CORE_PRS_YTD | |
| Flat Amount Deduction | _CORE_PRS_TU_RUN | |
| Flat Amount Deduction | _CORE_PRS_TU_PY_PTD | |
| Flat Amount Deduction | _CORE_PRS_TU_YTD | |
| Flat Amount Deduction | _CORE_ASG_RUN | |
| Flat Amount Deduction | _CORE_ASG_PY_PTD | |
| Flat Amount Deduction | _CORE_ASG_MTD | |
| Flat Amount Deduction | _CORE_ASG_QTD | |
| Flat Amount Deduction | _CORE_ASG_YTD | |
| Flat Amount Deduction | _CORE_ASG_TU_RUN | |
| Flat Amount Deduction | _CORE_ASG_TU_PY_PTD | |
| Flat Amount Deduction | _CORE_ASG_TU_YTD | |
| Flat Amount Deduction | _CORE_ASG_LTD | |
| Flat Amount Deduction | _CORE_ASG_TU_LTD | |
| Flat Amount Deduction | _CORE_PRS_LTD | |
| Flat Amount Deduction | _CORE_PRS_TU_LTD | |
| Flat Amount Deduction Arrears | _CORE_PRS_RUN | |
| Flat Amount Deduction Arrears | _CORE_PRS_PY_PTD | |
| Flat Amount Deduction Arrears | _CORE_PRS_MTD | |
| Flat Amount Deduction Arrears | _CORE_PRS_QTD | |
| Flat Amount Deduction Arrears | _CORE_PRS_YTD | |
| Flat Amount Deduction Arrears | _CORE_PRS_TU_RUN | |
| Flat Amount Deduction Arrears | _CORE_PRS_TU_PY_PTD | |
| Flat Amount Deduction Arrears | _CORE_PRS_TU_YTD | |
| Flat Amount Deduction Arrears | _CORE_ASG_RUN | |
| Flat Amount Deduction Arrears | _CORE_ASG_PY_PTD | |
| Flat Amount Deduction Arrears | _CORE_ASG_MTD | |
| Flat Amount Deduction Arrears | _CORE_ASG_QTD | |
| Flat Amount Deduction Arrears | _CORE_ASG_YTD | |
| Flat Amount Deduction Arrears | _CORE_ASG_TU_RUN | |
| Flat Amount Deduction Arrears | _CORE_ASG_TU_PY_PTD | |
| Flat Amount Deduction Arrears | _CORE_ASG_TU_YTD | |
| Flat Amount Deduction Arrears | _CORE_ASG_LTD | |
| Flat Amount Deduction Arrears | _CORE_ASG_TU_LTD | |
| Flat Amount Deduction Arrears | _CORE_ASG_EE_LTD | |
| Flat Amount Deduction Arrears | _CORE_PRS_LTD | |
| Flat Amount Deduction Arrears | _CORE_PRS_TU_LTD | |
| Flat Amount Deduction Not Taken | _CORE_PRS_RUN | |
| Flat Amount Deduction Not Taken | _CORE_PRS_PY_PTD | |
| Flat Amount Deduction Not Taken | _CORE_PRS_MTD | |
| Flat Amount Deduction Not Taken | _CORE_PRS_QTD | |
| Flat Amount Deduction Not Taken | _CORE_PRS_YTD | |
| Flat Amount Deduction Not Taken | _CORE_PRS_TU_RUN | |
| Flat Amount Deduction Not Taken | _CORE_PRS_TU_PY_PTD | |
| Flat Amount Deduction Not Taken | _CORE_PRS_TU_YTD | |
| Flat Amount Deduction Not Taken | _CORE_ASG_RUN | |
| Flat Amount Deduction Not Taken | _CORE_ASG_PY_PTD | |
| Flat Amount Deduction Not Taken | _CORE_ASG_MTD | |
| Flat Amount Deduction Not Taken | _CORE_ASG_QTD | |
| Flat Amount Deduction Not Taken | _CORE_ASG_YTD | |
| Flat Amount Deduction Not Taken | _CORE_ASG_TU_RUN | |
| Flat Amount Deduction Not Taken | _CORE_ASG_TU_PY_PTD | |
| Flat Amount Deduction Not Taken | _CORE_ASG_TU_YTD | |
| Flat Amount Deduction Not Taken | _CORE_ASG_LTD | |
| Flat Amount Deduction Not Taken | _CORE_ASG_TU_LTD | |
| Flat Amount Deduction Not Taken | _CORE_PRS_LTD | |
| Flat Amount Deduction Not Taken | _CORE_PRS_TU_LTD | |
| Flat Amount Deduction Accrued | _CORE_PRS_RUN | |
| Flat Amount Deduction Accrued | _CORE_PRS_PY_PTD | |

-continued

| Defined Balances | | |
|---|---|---|
| BALANCE TYPE | DIMENSION | EXCLUSION RULE |
| Flat Amount Deduction Accrued | _CORE_PRS_MTD | |
| Flat Amount Deduction Accrued | _CORE_PRS_QTD | |
| Flat Amount Deduction Accrued | _CORE_PRS_YTD | |
| Flat Amount Deduction Accrued | _CORE_PRS_TU_RUN | |
| Flat Amount Deduction Accrued | _CORE_PRS_TU_PY_PTD | |
| Flat Amount Deduction Accrued | _CORE_PRS_TU_YTD | |
| Flat Amount Deduction Accrued | _CORE_ASG_RUN | |
| Flat Amount Deduction Accrued | _CORE_ASG_PY_PTD | |
| Flat Amount Deduction Accrued | _CORE_ASG_MTD | |
| Flat Amount Deduction Accrued | _CORE_ASG_QTD | |
| Flat Amount Deduction Accrued | _CORE_ASG_YTD | |
| Flat Amount Deduction Accrued | _CORE_ASG_TU_RUN | |
| Flat Amount Deduction Accrued | _CORE_ASG_TU_PY_PTD | |
| Flat Amount Deduction Accrued | _CORE_ASG_TU_YTD | |
| Flat Amount Deduction Accrued | _CORE_ASG_LTD | |
| Flat Amount Deduction Accrued | _CORE_ASG_TU_LTD | |
| Flat Amount Deduction Accrued | _CORE_ASG_EE_LTD | |
| Flat Amount Deduction Accrued | _CORE_PRS_LTD | |
| Flat Amount Deduction Accrued | _CORE_PRS_TU_LTD | |

| Retro Component Usages | |
|---|---|
| CREATOR TYPE | ET |
| CREATOR | Flat Amount Deduction |
| RETRO COMPONENT | Replacement |
| DEFAULT COMPONENT | Y |
| REPROCESS TYPE | R |

Example Percentage of Deduction Predefined Template:

| Element Types | |
|---|---|
| CLASSIFICATION NAME | {Chosen classification} |
| ADDITIONAL ENTRY ALLOWED FLAG | {RULE:Over Ride DEFAULT:N} |
| ADJUSTMENT ONLY FLAG | N |
| CLOSED FOR ENTRY FLAG | N |
| ELEMENT NAME | Percentage Deduction Special Feature |
| INDIRECT ONLY FLAG | N |
| MULTIPLE ENTRIES ALLOWED FLAG | {RULE:Multiple Entries DEFAULT:N} |
| STARTING TIME DEF | {RULE: Hire Process DEFAULT:On Hire Date} |
| ENDING TIME DEF | {RULE: Termination Process DEFAULT:On Final Close Date} |
| PROCESS IN RUN FLAG | Y |
| RELATIVE PROCESSING PRIORITY | 50 |
| PROCESSING TYPE | {RULE:Recurring Or NonRecurring VALUE:N} |
| STANDARD LINK FLAG | {RULE:Availability Rule DEFAULT:N} |
| INPUT CURRENCY CODE | {RULE:Specify Currency DEFAULT:<Currency code for the given country>} |
| OUTPUT CURRENCY CODE | {RULE:Output Currency DEFAULT:<Currency of the given country>} |
| ONCE EACH PERIOD FLAG | |

-continued

| Element Types | |
|---|---|
| USE AT REL LEVEL | |
| USE AT TERM LEVEL | |
| USE AT ASG LEVEL | |
| PRORATION FORMULA | _PERCENTAGE_OF_DEDUCTION_PRORATION |
| PRORATION GROUP | {RULE:Proration DEFAULT:N} |
| TIME DEFINITION TYPE | ? |
| TIME DEFINITION | ? |
| RECALC EVENT GROUP | {RULE:Retro DEFAULT:N} |
| REPORTING NAME | SF |
| ITERATIVE FLAG | {RULE:Iterative Information DEFAULT:N} |
| ITERATIVE FORMULA | DEFAULT_GROSSUP |
| ITERATIVE PRIORITY | 10 |
| PROCESS MODE | |

| Element Type Usages |
|---|
| ELEMENT TYPE |
| INCLUSION FLAG |
| RUN TYPE NAME |
| EXCLUSION RULE |

| Fast Formulas | |
|---|---|
| FORMULA NAME | _PCT_DEDN |
| DESCRIPTION | Percentage Deduction formula for Deduction Template |
| FORMULA TEXT | /**********************************************<br>*************************<br>FORMULA NAME:  _PCT_DEDN<br>FORMULA TYPE:  Payroll<br>DESCRIPTION:   Formula for Flat Amount for Deduction Template.<br>              Returns pay value (Amount);<br>********************************************<br>*************************<br>FORMULA TEXT<br>Formula Results :<br>  dedn_amt      Direct Result for Deduction Amount<br>  not_taken     Update Deduction Recurring Entry Not Taken<br>  to_arrears    Update Deduction Recurring Entry Arrears Contr<br>  set_clear     Update Deduction Recurring Entry Clear Arrears<br>  STOP_ENTRY    Stop current recurring entry<br>  to_total_owed  Update Deduction Recurring Entry Accrued<br>  mesg          Message (Warning)<br>********************************************<br>***************************/<br>/* Database Item Defaults */<br>default for INSUFFICIENT_FUNDS_TYPE          is 'NOT ENTERED'<br>/* ===== Database Item Defaults End ===== */<br>/* ===== Input Value Defaults Begin ===== */<br>DEFAULT FOR Total_Owed               IS 0<br>DEFAULT FOR Clear_Arrears (text)     IS 'N'<br>DEFAULT FOR Percentage               IS 0<br>/* ===== Input Value Defaults End ===== */<br>DEFAULT FOR mesg                     IS 'NOT ENTERED'<br>/* ===== Inputs Section Begin ===== */<br>INPUTS ARE<br>    Percentage<br>   ,Total_Owed<br>  ,Clear_Arrears (text) |

| Fast Formulas |
| --- |

```
/* ===== Inputs Section End ===== */
IF Percentage WAS DEFAULTED THEN
(
    mesg =
GET_MESG('PAY','PAY_NO_VALUE_TO_CALC_DED'
,'BASE_NAME','<BASE_NAME>')
    RETURN mesg
)
ELSE
(
    dedn_amt = (Percentage *
<BASE_NAME>_ELIGIBLE_COMP_ASG_GRE_RUN  /  100)
/* ---------------------------------------------
----------------------
CUSTOMER :  The formula is generated with a
default to use the Eligible
        Compensation to calculate % of Earnings.
The Eligible Compensation
        balance is initially defined with the same
balance feeds as the Regular
        Earnings balance.
        You can modify the earnings basis for this
calculation by
        adding and deleting balance feeds to the
        <BASE_NAME>_ELIGIBLE_COMP balance.
        If you want the formula to use another
balance of earnings in
        the run, replace the
<BASE_NAME>_ELIGIBLE_COMP_ASG_GRE_RUN database
item
        reference below with the database item for
the balance of choice :
<BALANCE_NAME_IN_UPPER_CASE/UNDERSCORES>_ASG_GRE_RUN
  ------------------------------------------------
--------------------
*/
)
to_total_owed     = 0
to_arrears        = 0
to_not_taken      = 0
total_dedn        = 0
insuff_funds_type = INSUFFICIENT_FUNDS_TYPE
net_amount        = NET_PAY_ASG_GRE_RUN
/* ====  Entry ITD Check Begin ==== */
    IF ( <BASE_NAME>_ACCRUED_ENTRY_ITD = 0 AND
        <BASE_NAME>_ACCRUED_ASG_GRE_ITD <> 0 )
THEN
    (
        to_total_owed = -1 *
<BASE_NAME>_ACCRUED_ASG_GRE_ITD + dedn_amt
    )
    IF ( <BASE_NAME>_ARREARS_ENTRY_ITD = 0 AND
        <BASE_NAME>_ARREARS_ASG_GRE_ITD <> 0 )
THEN
    (
        to_arrears = -1 *
<BASE_NAME>_ARREARS_ASG_GRE_ITD
    )
/* ====  Entry ITD Check End ==== */
/* ===== Arrears Section Begin ===== */
    IF Clear_Arrears = 'Y' THEN
    (
        to_arrears = -1 *
<BASE_NAME>_ARREARS_ASG_GRE_ITD
        set_clear = 'No'
    )
    ELSE
    (
        IF <BASE_NAME>_ARREARS_ASG_GRE_ITD <> 0 THEN
        (
            to_arrears = -1 *
<BASE_NAME>_ARREARS_ASG_GRE_ITD
        )
    )
    IF ( net_amount - dedn_amt < 0 ) THEN
    (
        IF insuff_funds_type = 'ERRA' THEN
```

| Fast Formulas |
|---|

```
        (
          mesg =
GET_MESG('PAY','PAY_MX_INSUFF_FUNDS_FOR_DED')
          RETURN mesg
        )
     )
     /* When there is no arrears */
     IF ( insuff_funds_type = 'PD' OR
          insuff_funds_type = 'NONE' ) THEN
     (
        IF ( net_amount − dedn_amt >= 0 ) THEN
        (
          to_arrears    = 0
          to_not_taken  = 0
          dedn_amt      = dedn_amt
        )
        ELSE
        (
          IF ( insuff_funds_type = 'PD' ) THEN
          (
             to_arrears    = 0
             to_not_taken  = dedn_amt − net amount
             dedn_amt      = net_amount
          )
          ELSE
          (
             to_arrears    = 0
             to_not_taken  = dedn_amt
             dedn_amt      = 0
          )
        )
     )
     ELSE /* When there is arrears */
     (
        IF ( net_amount <= 0 ) THEN
        (
          to_arrears    = dedn_amt
          to_not_taken  = dedn_amt
          dedn_amt      = 0
        )
        ELSE
        (
          total_dedn = dedn_amt +
<BASE_NAME>_ARREARS_ASG_GRE_ITD
          IF ( net_amount >= total_dedn ) THEN
          (
             to_arrears    = −1 *
<BASE_NAME>_ARREARS_ASG_GRE_ITD
             to_not_taken  = 0
             dedn_amt      = total_dedn
          )
          ELSE
          (
             IF ( insuff_funds_type = 'APD' ) THEN
             (
                to_arrears    = total_dedn −
net_amount
                to_arrears    = to_arrears −
<BASE_NAME>_ARREARS_ASG_GRE_ITD
                IF ( net_amount >= dedn_amt ) THEN
                (
                   to_not_taken  = 0
                )
                ELSE
                (
                   to_not_taken  = to_arrears
                )
                dedn_amt      = net_amount
             )
             ELSE
             (
                IF ( net_amount >= dedn_amt ) THEN
                (
                   to_arrears    = 0
                   to_not_taken  = 0
                   dedn_amt      = dedn_amt
                )
```

| Fast Formulas |
|---|
| ELSE<br> (<br>  to_arrears = dedn_amt<br>  to_not_taken = dedn_amt<br>  dedn_amt = 0<br> )<br>  )<br>  )<br> )<br>)<br>/* ===== Arrears Section End ===== */<br>/* ===== Stop Rule Section Begin ===== */<br> to_total_owed = dedn_amt<br> IF Total_Owed WAS NOT DEFAULTED THEN<br> (<br>  total_accrued = dedn_amt +<br><BASE_NAME>_ACCRUED_ASG_GRE_ITD<br>  IF total_accrued >= Total_Owed THEN<br>  (<br>   dedn_amt = Total_Owed −<br><BASE_NAME>_ACCRUED_ASG_GRE_ITD<br>   /* The total has been reached - the return will stop the entry under<br>   these conditions. Also, zero out Accrued balance. */<br>   to_total_owed = −1 *<br><BASE_NAME>_ACCRUED_ASG_GRE_ITD<br>   STOP_ENTRY = 'Y'<br>   mesg =<br>GET_MESG('PAY','PAY_MX_STOPPED_ENTRY',<br>'BASE_NAME','<BASE_NAME>')<br>  )<br> )<br>/* ===== Stop Rule Section End ===== */<br> RETURN dedn_amt,<br>  to_not_taken,<br>  to_arrears,<br>  to_total_owed,<br>  STOP_ENTRY,<br>  set_clear,<br>  mesg<br>/* End Formula Text */ |

| | |
|---|---|
| FORMULA NAME | _PERCENTAGE_OF_DEDUCTION_PRORATION |
| DESCRIPTION | Formula for Percentage of Deduction Proration Template |
| FORMULA TEXT | /**************************************************<br>********<br>Description : Formula to calculate pro rated amounts.<br>DISCLAIMER : This formula is strictly for example or prototype<br> purposes only. You should update the formula to meet your particular<br> requirements. This formula may contain certain hard<br> coded values to simplify the use of formulas for proration. A typical example<br> of proration would be when a new employee starts work in the middle of a<br> monthly payroll period and your payroll department makes a pro-rata payment<br> to reflect the proportion of monthly pay to which the employee is entitled.<br> The prototype formula supplied is only designed to work for payroll<br> calculations involving proration and should not be used for any other purpose.<br> Any use of the formula is subject to the terms of the Oracle license agreement<br> for the HRMS programs and documentation.<br>************************************************<br>**********/<br>default for prorate_start is '01-JAN-1900' (date)<br>default for prorate_end is '01-JAN-1900' (date)<br>default for amount is 0.0 |

| Fast Formulas |
|---|
| inputs are prorate_start (date),<br>prorate_end (date),<br>annual_amount (number)<br>/<br>   Prorate_start and prorate_end dates are passed from the payroll engine. These<br>   dates basically represent the dates on which the changes occur in the<br>   deduction amount during the pay period.<br>annual_amount is an input value<br>   created in the element to which this formula will be tied. Here the<br>   assumption is that the user enters the annual deduction amount in the<br>   input value.<br>/<br>l_amount = annual_amount<br>message = 'Proration Start Date ' \|\|<br>TO_CHAR(prorate_start, 'DD-MON-YYYY')<br>IF (prorate_start was defaulted) then<br>(<br>/<br>   prorate_start date is defaulted when no pro ration occurs. Therefore we<br>   should just return the annual deduction amount divided by 12.<br>/<br>    l_amount = l_amount / 12<br>    return l_amount, message<br>)<br>else<br>(<br>    l_days = days_between(prorate_end , prorate_start) + 1<br>/<br>   l_days stores the number of days between prorate start and prorate<br>   end dates<br>/<br>    l_days_in_fiscal_year = 365<br>/<br>   It is another assumption that a year contains 365 days. Please change<br>   this assumption to take care of leap year. This formula will not work<br>   properly in a leap year.<br>/<br>    l_amount = (l_amount * l_days) / l_days_in_fiscal_year<br>/<br>   In the above calculation, since l_amount contains the annual deduction amount,<br>   it is divided by 365 days of the year to get the deduction amount per day.<br>   This amount is then multiplied by the number of days in question to get<br>   the proper deduction amount<br>/<br>return l_amount, message<br>) |

| | | Formula Rules | |
|---|---|---|---|
| SHADOW ELEMENT TYPE | Percentage Deduction | Percentage Deduction | Percentage Deduction |
| FORMULA | _PCT_DEDN | _PCT_DEDN | _PCT_DEDN |
| ELEMENT TYPE EXCLUSION RULE | Percentage Deduction | Percentage Deduction Special Feature {RULE:Total Reached VALUE:N} | Percentage Deduction Special Feature {RULE:Earning Threshold VALUE:ERRA}, {RULE:Earning Threshold |

| Formula Rules | | | |
|---|---|---|---|
| | | | VALUE:NONE},<br>{RULE:Earning Threshold VALUE:PD} |
| RESULT NAME | dedn_amt | to_total_owed | to_arrears |
| INPUT VALUE | Pay Value | Accrued | Arrears Contr |
| RESULT RULE TYPE | D | I | I |
| SHADOW ELEMENT TYPE | Percentage Deduction | Percentage Deduction | Percentage Deduction |
| FORMULA | _PCT_DEDN | _PCT_DEDN | _PCT_DEDN |
| ELEMENT TYPE | Percentage Deduction Special Feature | Percentage Deduction | Percentage Deduction |
| EXCLUSION RULE | | | {RULE:Earning Threshold VALUE:ERRA},<br>{RULE:Earning Threshold VALUE:NONE},<br>{RULE:Earning Threshold VALUE:PD} |
| RESULT NAME | to_not_taken | STOP_ENTRY | set_clear |
| INPUT VALUE | Not Taken | | Clear Arrears |
| RESULT RULE TYPE | I | S | U |

| Balance Types | | | | | |
|---|---|---|---|---|---|
| EXCLUSION RULE | N | N | N | N | N |
| ASSIGNMENT REMUNERATION FLAG | Percentage Deduction | Percentage Deduction Eligible Comp | Percentage Deduction Accrued | Percentage Deduction Arrears | Percentage Deduction Not Taken |
| BALANCE NAME | M | M | M | M | M |
| BALANCE UOM | {RULE: Output Currency DEFAULT:< Currency of the given country>} | {RULE: Output Currency DEFAULT:< Currency of the given country>} | {RULE: Output Currency DEFAULT:< Currency of the given country>} | {RULE: Output Currency DEFAULT:< Currency of the given country>} | {RULE: Output Currency DEFAULT:< Currency of the given country>} |
| CURRENCY CODE | Primary balance for Percentage Deductions. | Eligible Comp. balance for Percentage Deduction. | Accrued balance for Percentage Deduction. | Arrears balance for Percentage Deduction. | Not Taken balance for Percentage Deduction. |
| COMMENTS | | Eligible Comp | Accrued | Arrears | Not Taken |
| REPORTING NAME | Deductions | Wages | Wages | Wages | Wages |
| CATEGORY NAME | | Percentage Deduction | Percentage Deduction | Percentage Deduction | Percentage Deduction |
| BASE BALANCE TYPE | Pay Value | | | | |
| INPUT VALUE | N | N | N | N | N |

| Input Values | | | | | |
|---|---|---|---|---|---|
| ELEMENT TYPE | Percentage Deduction | Percentage Deduction | Percentage Deduction | Percentage Deduction | Percentage Deduction Special Features |
| EXCLUSION RULE | | | {RULE:Earning Threshold VALUE:ERRA}, | | {RULE:Total Reached VALUE:N} |

-continued

| | | | Input Values | | | |
|---|---|---|---|---|---|---|
| | | | {RULE:Earning Threshold VALUE:NONE}, {RULE:Earning Threshold VALUE:PD} | | | |
| DISPLAY SEQUENCE | 1 | 2 | 3 | | 4 | 1 |
| GENERATE DB ITEMS FLAG | Y | Y | Y | | Y | Y |
| HOT DEFAULT FLAG | N | N | N | | N | N |
| MANDATORY FLAG | X | N | N | | N | X |
| NAME | Pay Value | Percentage | Clear Arrears | | Total Owed | Pay Value |
| UOM | M | M | C | | M | M |
| LOOKUP TYPE | | | YES_NO | | | |
| DEFAULT VALUE | | | N | | | |
| DEFAULT VALUE COLUMN | | | | | | |
| ELEMENT TYPE | Percentage Deduction Special Features | Percentage Deduction Special Features | Percentage Deduction Special Features | | | |
| EXCLUSION RULE | {RULE:Total Reached VALUE:N} | | {RULE:Earning Threshold VALUE:ERRA}, {RULE:Earning Threshold VALUE:NONE}, {RULE:Earning Threshold VALUE:PD} | | | |
| EXCLUSION RULE VALUE | N | | N | | | |
| DISPLAY SEQUENCE | 2 | 3 | 4 | | | |
| GENERATE DB ITEMS FLAG | Y | Y | Y | | | |
| HOT DEFAULT FLAG | N | N | N | | | |
| MANDATORY FLAG | X | X | X | | | |
| NAME | Accrued | Not Taken | Arrears Contr | | | |
| UOM | M | M | M | | | |
| LOOKUP TYPE | | | | | | |
| DEFAULT VALUE | | | | | | |
| DEFAULT VALUE COLUMN | | | | | | |

| | | Balance Feeds | | |
|---|---|---|---|---|
| INPUT VALUE | Pay Value | Arrears Contr | Accrued | Not Taken |
| BALANCE TYPE | Percentage Deduction | Percentage Deduction Arrears | Percentage Deduction Accrued | Percentage Deduction Not Taken |
| EXCLUSION RULE | | | | |
| SCALE | 1 | 1 | 1 | 1 |
| BALANCE NAME | Pay Value | Arrears Contr | Accrued | Not Taken |

| | Defined Balances | |
|---|---|---|
| BALANCE TYPE | DIMENSION | EXCLUSION RULE |
| Percentage Deduction | _CORE_PRS_RUN | |
| Percentage Deduction | _CORE_PRS_PY_PTD | |
| Percentage Deduction | _CORE_PRS_MTD | |
| Percentage Deduction | _CORE_PRS_QTD | |
| Percentage Deduction | _CORE_PRS_YTD | |
| Percentage Deduction | _CORE_PRS_TU_RUN | |
| Percentage Deduction | _CORE_PRS_TU_PY_PTD | |
| Percentage Deduction | _CORE_PRS_TU_YTD | |
| Percentage Deduction | _CORE_ASG_RUN | |
| Percentage Deduction | _CORE_ASG_PY_PTD | |
| Percentage Deduction | _CORE_ASG_MTD | |
| Percentage Deduction | _CORE_ASG_QTD | |
| Percentage Deduction | _CORE_ASG_YTD | |

Defined Balances

| BALANCE TYPE | DIMENSION | EXCLUSION RULE |
|---|---|---|
| Percentage Deduction | _CORE_ASG_TU_RUN | |
| Percentage Deduction | _CORE_ASG_TU_PY_PTD | |
| Percentage Deduction | _CORE_ASG_TU_YTD | |
| Percentage Deduction | _CORE_ASG_LTD | |
| Percentage Deduction | _CORE_ASG_TU_LTD | |
| Percentage Deduction | _CORE_PRS_LTD | |
| Percentage Deduction | _CORE_PRS_TU_LTD | |
| Percentage Deduction Accrued | _CORE_PRS_RUN | |
| Percentage Deduction Accrued | _CORE_PRS_PY_PTD | |
| Percentage Deduction Accrued | _CORE_PRS_MTD | |
| Percentage Deduction Accrued | _CORE_PRS_QTD | |
| Percentage Deduction Accrued | _CORE_PRS_YTD | |
| Percentage Deduction Accrued | _CORE_PRS_TU_RUN | |
| Percentage Deduction Accrued | _CORE_PRS_TU_PY_PTD | |
| Percentage Deduction Accrued | _CORE_PRS_TU_YTD | |
| Percentage Deduction Accrued | _CORE_ASG_RUN | |
| Percentage Deduction Accrued | _CORE_ASG_PY_PTD | |
| Percentage Deduction Accrued | _CORE_ASG_MTD | |
| Percentage Deduction Accrued | _CORE_ASG_QTD | |
| Percentage Deduction Accrued | _CORE_ASG_YTD | |
| Percentage Deduction Accrued | _CORE_ASG_TU_RUN | |
| Percentage Deduction Accrued | _CORE_ASG_TU_PY_PTD | |
| Percentage Deduction Accrued | _CORE_ASG_TU_YTD | |
| Percentage Deduction Accrued | _CORE_ASG_LTD | |
| Percentage Deduction Accrued | _CORE_ASG_TU_LTD | |
| Percentage Deduction Accrued | _CORE_ASG_EE_LTD | |
| Percentage Deduction Accrued | _CORE_PRS_LTD | |
| Percentage Deduction Accrued | _CORE_PRS_TU_LTD | |
| Percentage Deduction Eligible Comp | _CORE_PRS_RUN | |
| Percentage Deduction Eligible Comp | _CORE_PRS_PY_PTD | |
| Percentage Deduction Eligible Comp | _CORE_PRS_MTD | |
| Percentage Deduction Eligible Comp | _CORE_PRS_QTD | |
| Percentage Deduction Eligible Comp | _CORE_PRS_YTD | |
| Percentage Deduction Eligible Comp | _CORE_PRS_TU_RUN | |
| Percentage Deduction Eligible Comp | _CORE_PRS_TU_PY_PTD | |
| Percentage Deduction Eligible Comp | _CORE_PRS_TU_YTD | |
| Percentage Deduction Eligible Comp | _CORE_ASG_RUN | |
| Percentage Deduction Eligible Comp | _CORE_ASG_PY_PTD | |
| Percentage Deduction Eligible Comp | _CORE_ASG_MTD | |
| Percentage Deduction Eligible Comp | _CORE_ASG_QTD | |
| Percentage Deduction Eligible Comp | _CORE_ASG_YTD | |
| Percentage Deduction Eligible Comp | _CORE_ASG_TU_RUN | |
| Percentage Deduction Eligible Comp | _CORE_ASG_TU_PY_PTD | |
| Percentage Deduction Eligible Comp | _CORE_ASG_TU_YTD | |
| Percentage Deduction Eligible Comp | _CORE_ASG_LTD | |
| Percentage Deduction Eligible Comp | _CORE_ASG_TU_LTD | |
| Percentage Deduction Eligible Comp | _CORE_PRS_LTD | |
| Percentage Deduction Eligible Comp | _CORE_PRS_TU_LTD | |
| Percentage Deduction Arrears | _CORE_PRS_RUN | |
| Percentage Deduction Arrears | _CORE_PRS_PY_PTD | |
| Percentage Deduction Arrears | _CORE_PRS_MTD | |
| Percentage Deduction Arrears | _CORE_PRS_QTD | |
| Percentage Deduction Arrears | _CORE_PRS_YTD | |
| Percentage Deduction Arrears | _CORE_PRS_TU_RUN | |
| Percentage Deduction Arrears | _CORE_PRS_TU_PY_PTD | |
| Percentage Deduction Arrears | _CORE_PRS_TU_YTD | |
| Percentage Deduction Arrears | _CORE_ASG_RUN | |
| Percentage Deduction Arrears | _CORE_ASG_PY_PTD | |
| Percentage Deduction Arrears | _CORE_ASG_MTD | |
| Percentage Deduction Arrears | _CORE_ASG_QTD | |
| Percentage Deduction Arrears | _CORE_ASG_YTD | |
| Percentage Deduction Arrears | _CORE_ASG_TU_RUN | |
| Percentage Deduction Arrears | _CORE_ASG_TU_PY_PTD | |
| Percentage Deduction Arrears | _CORE_ASG_TU_YTD | |
| Percentage Deduction Arrears | _CORE_ASG_LTD | |
| Percentage Deduction Arrears | _CORE_ASG_TU_LTD | |
| Percentage Deduction Arrears | _CORE_ASG_EE_LTD | |
| Percentage Deduction Arrears | _CORE_PRS_LTD | |
| Percentage Deduction Arrears | _CORE_PRS_TU_LTD | |
| Percentage Deduction Not Taken | _CORE_PRS_RUN | |
| Percentage Deduction Not Taken | _CORE_PRS_PY_PTD | |
| Percentage Deduction Not Taken | _CORE_PRS_MTD | |
| Percentage Deduction Not Taken | _CORE_PRS_QTD | |
| Percentage Deduction Not Taken | _CORE_PRS_YTD | |
| Percentage Deduction Not Taken | _CORE_PRS_TU_RUN | |
| Percentage Deduction Not Taken | _CORE_PRS_TU_PY_PTD | |
| Percentage Deduction Not Taken | _CORE_PRS_TU_YTD | |

-continued

Defined Balances

| BALANCE TYPE | DIMENSION | EXCLUSION RULE |
|---|---|---|
| Percentage Deduction Not Taken | _CORE_ASG_RUN | |
| Percentage Deduction Not Taken | _CORE_ASG_PY_PTD | |
| Percentage Deduction Not Taken | _CORE_ASG_MTD | |
| Percentage Deduction Not Taken | _CORE_ASG_QTD | |
| Percentage Deduction Not Taken | _CORE_ASG_YTD | |
| Percentage Deduction Not Taken | _CORE_ASG_TU_RUN | |
| Percentage Deduction Not Taken | _CORE_ASG_TU_PY_PTD | |
| Percentage Deduction Not Taken | _CORE_ASG_TU_YTD | |
| Percentage Deduction Not Taken | _CORE_ASG_LTD | |
| Percentage Deduction Not Taken | _CORE_ASG_TU_LTD | |
| Percentage Deduction Not Taken | _CORE_PRS_LTD | |
| Percentage Deduction Not Taken | _CORE_PRS_TU_LTD | |

Retro Component Usages

| | |
|---|---|
| CREATOR TYPE | ET |
| CREATOR | Percentage Deduction |
| RETRO COMPONENT | Replacement |
| DEFAULT | Y |
| COMPONENT REPROCESS TYPE | R |

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
selecting a predefined payroll element template from a plurality of predefined payroll element templates based on user input received via a graphical user interface;
accessing the predefined payroll element template to identify a rule contained therein;
creating a question based on the identified rule;
presenting the question to a user via the graphical user interface;
receiving via the graphical user interface a template modification value, wherein the template modification value is input by the user via the graphical user interface in response to the question;
automatically customizing the predefined payroll element template, based upon the template modification value, to create a customized payroll element template; and
storing the customized payroll element template, wherein the accessing the predefined payroll element template, the receiving the template modification value, the customizing the predefined payroll element, and the storing the customized payroll element template are performed by a computing device implementing a payroll engine.

2. The method of claim 1, further comprising creating one or more payroll objects, based upon the customized payroll element template.

3. The method of claim 1, further comprising providing at least a portion of a payroll questionnaire for display to the user in a payroll wizard window, wherein the same payroll wizard window displays a first set of questions used to customize an earnings template and a second set of questions used to customize a deduction template.

4. The method of claim 1:
wherein the template modification value indicates that a first record of a plurality of records included in the predefined payroll element template should be excluded from the customized payroll element template;
wherein the creating the customized payroll element template comprises excluding the first record from the customized payroll element template and excluding one or more additional records from the customized payroll element template, wherein the one or more additional records are children of the first record within a hierarchy, and wherein the predefined payroll element template comprises the first record and the one or more additional records.

5. The method of claim 1, wherein the template modification value indicates that a first record included in the predefined payroll element template should have a specific default value in the customized payroll element template, wherein the template modification value comprises the specific default value.

6. The method of claim 1, further comprising receiving a second template modification value, wherein the second template modification value indicates that a second question should not be displayed to the user during a payroll configuration session to generate either the customized payroll element template or an object created from the customized payroll element template.

7. The method of claim 1, further comprising receiving a second template modification value, wherein the second rule modification is received in response to user input selecting the predefined payroll template, and wherein the customizing the predefined payroll element template is based upon the second template modification value.

8. A non-transitory computer readable medium (CRM) comprising instructions executable by a computing device, wherein the computing device implements a method in response to executing the instructions, the method comprising:
selecting a predefined payroll element template from a plurality of predefined payroll element templates based on user input received via a graphical user interface;
accessing the predefined payroll element template to identify a rule contained therein;
creating a question based on the identified rule;
presenting the question to a user via the graphical user interface;
receiving via the graphical user interface a template modification value, wherein the template modification value is input by the user via the graphical user interface in response to the question;
automatically customizing the predefined payroll element template, based upon the template modification value, to create a customized payroll element template; and storing the customized payroll element template, wherein the accessing the predefined payroll element template, the receiving the template modification value, the customizing the predefined payroll element, and the storing the customized payroll element template are performed by a computing device implementing a payroll engine.

9. The non-transitory CRM of claim 8 wherein the method further comprises creating one or more payroll objects, based upon the customized payroll element template.

10. The non-transitory CRM of claim 8 wherein the method further comprises providing at least a portion of a payroll questionnaire for display to the user in a payroll wizard window, wherein the same payroll wizard window displays a first set of questions used to customize an earnings template and a second set of questions used to customize a deduction template.

11. The non-transitory CRM of claim 8:
wherein the template modification value indicates that a first record of a plurality of records included in the predefined payroll element template should be excluded from the customized payroll element template;
wherein the creating the customized payroll element template comprises excluding the first record from the customized payroll element template and excluding one or more additional records from the customized payroll element template, wherein the one or more additional records are children of the first record within a hierarchy, and wherein the predefined payroll element template comprises the first record and the one or more additional records.

12. The non-transitory CRM of claim 8 wherein the template modification value indicates that a first record included in the predefined payroll element template should have a specific default value in the customized payroll element template, wherein the template modification value comprises the specific default value.

13. The non-transitory CRM of claim 8 wherein the method further comprises receiving a second template modification value, wherein the second template modification value indicates that a second question should not be displayed to the user during a payroll configuration session to generate either the customized payroll element template or an object created from the customized payroll element template.

14. The non-transitory CRM of claim 8 wherein the method further comprises receiving a second template modification value, wherein the second rule modification is received in response to user input selecting the predefined payroll template, and wherein the customizing the predefined payroll element template is based upon the second template modification value.

15. A computing device comprising:
non-transitory computer readable medium (CRM) comprising instructions;
a processor for executing the instructions, wherein the processor implements a method in response to executing the instructions, the method comprising:
selecting a predefined payroll element template from a plurality of predefined payroll element templates based on user input received via a graphical user interface;
accessing the predefined payroll element template to identify a rule contained therein;
creating a question based on the identified rule;
presenting the question to a user via the graphical user interface;
receiving via the graphical user interface a template modification value, wherein the template modification value is input by the user via the graphical user interface in response to the question;
automatically customizing the predefined payroll element template, based upon the template modification value, to create a customized payroll element template; and
storing the customized payroll element template, wherein the accessing the predefined payroll element template, the receiving the template modification value, the customizing the predefined payroll element, and the storing the customized payroll element template are performed by a computing device implementing a payroll engine.

16. The computing device of claim 15 wherein the method further comprises creating one or more payroll objects, based upon the customized payroll element template.

17. The computing device of claim 15 wherein the method further comprises providing at least a portion of a payroll questionnaire for display to the user in a payroll wizard window, wherein the same payroll wizard window displays a first set of questions used to customize an earnings template and a second set of questions used to customize a deduction template.

18. The computing device of claim 15:
wherein the template modification value indicates that a first record of a plurality of records included in the predefined payroll element template should be excluded from the customized payroll element template;
wherein the creating the customized payroll element template comprises excluding the first record from the customized payroll element template and excluding one or more additional records from the customized payroll element template, wherein the one or more additional records are children of the first record within a hierarchy, and wherein the predefined payroll element template comprises the first record and the one or more additional records.

19. The computing device of claim 15 wherein the template modification value indicates that a first record included in the predefined payroll element template should have a specific default value in the customized payroll element template, wherein the template modification value comprises the specific default value.

20. The method of claim 1, further comprising:
creating one or more payroll objects, based upon the customized payroll element template;
providing, by the computing device, at least a portion of a payroll questionnaire for display to the user in a payroll wizard window displayed by the computing device, wherein the same payroll wizard window displays a first set of questions used to customize an earnings template and a second set of questions used to customize a deduction template;
receiving a second template modification value on the computing device, the second template modification value indicating that a second question should not be displayed to the user during a payroll configuration session to generate either the customized payroll element template or an object created from the customized payroll element template; and receiving a third template modification value on the computing device in response to the user input selecting the predefined payroll template, wherein, the customizing the predefined payroll element template is based on the template modification value, the second template modification value, and the third template modification value, further wherein, the third template modification value indicates that a first record included in the predefined payroll element template should have a specific default value in the customized payroll element template, wherein the third template modification value comprises the specific default value, and further wherein, the template modification value indicates that a first record of a plurality of records included in the predefined payroll element template should be excluded from the customized payroll element template, such that the customizing the predefined payroll element template comprises excluding, by the computing device, the first record from the customized payroll element template, and excluding, by the computing device, one or more additional records from the customized payroll element template, the one or more additional records being children of the first record within a hierarchy, and the predefined payroll element template comprising the first record and the one or more additional records.

* * * * *